(12) United States Patent
Kim

(10) Patent No.: US 11,881,030 B2
(45) Date of Patent: *Jan. 23, 2024

(54) METHOD FOR DETECTING VEHICLE AND DEVICE FOR EXECUTING THE SAME

(71) Applicant: THINKWARE CORPORATION, Seongnam-si (KR)

(72) Inventor: Shin Hyoung Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,175

(22) Filed: Sep. 7, 2022

(65) Prior Publication Data

US 2023/0005163 A1 Jan. 5, 2023

Related U.S. Application Data

(63) Continuation of application No. 16/705,973, filed on Dec. 6, 2019, now Pat. No. 11,475,576.

(30) Foreign Application Priority Data

Dec. 7, 2018 (KR) .......................... 10-2018-0156746
Nov. 22, 2019 (KR) .......................... 10-2019-0151276

(51) Int. Cl.
*G06V 20/58* (2022.01)
*G06T 7/73* (2017.01)
(Continued)

(52) U.S. Cl.
CPC ............. *G06V 20/58* (2022.01); *B60Q 9/008* (2013.01); *G06T 7/248* (2017.01); *G06T 7/50* (2017.01);
(Continued)

(58) Field of Classification Search
CPC .... G06V 20/58; G06V 10/98; G06V 2201/08; G06T 7/74; G06T 7/50; G06T 7/248;
(Continued)

(56) References Cited

U.S. PATENT DOCUMENTS 11,475,576 B2 * 10/2022 Kim .......................... G06T 7/50
11,610,078 B2 * 3/2023 Goel ....................... G06N 3/045
(Continued)

FOREIGN PATENT DOCUMENTS

CN 105270287 A 1/2016
CN 107380164 A 11/2017
(Continued)

OTHER PUBLICATIONS

Office Action dated Mar. 31, 2022, issued in counterpart EP Application No. 19214223.0. (7 pages).
(Continued)

*Primary Examiner* — Pinalben Patel
(74) *Attorney, Agent, or Firm* — WHDA, LLP

(57) ABSTRACT

There is provided a method for detecting a vehicle including receiving continuously captured front images, setting a search area of the vehicle in a target image based on a location of the vehicle or a vehicle area detected from a previous image among the front images, detecting the vehicle in the search area according to a machine learning model, and tracking the vehicle in the target image by using feature points of the vehicle extracted from the previous image according to a vehicle detection result based on the machine learning model. Since the entire image is not used as a vehicle detection area, a processing speed may be increased, and a forward vehicle tracked in an augmented reality navigation may be continuously displayed without interruption, thereby providing a stable service to the user.

20 Claims, 14 Drawing Sheets

(51) Int. Cl.
  *G06T 7/50* (2017.01)
  *G06T 7/246* (2017.01)
  *B60Q 9/00* (2006.01)
  *G06V 10/98* (2022.01)
  *B60R 11/04* (2006.01)

(52) U.S. Cl.
  CPC ............... *G06T 7/74* (2017.01); *G06V 10/98* (2022.01); *B60R 11/04* (2013.01); *G06T 2207/20081* (2013.01); *G06T 2207/30252* (2013.01); *G06V 2201/08* (2022.01)

(58) Field of Classification Search
  CPC ........... G06T 2207/20081; G06T 2207/30252; B60Q 9/008; B60R 11/04
  See application file for complete search history.

(56) References Cited

U.S. PATENT DOCUMENTS

| | | |
|---|---|---|
| 2004/0234136 A1 | 11/2004 | Zhu et al. |
| 2015/0310624 A1 | 10/2015 | Bulan et al. |
| 2015/0344032 A1 | 12/2015 | Oh et al. |
| 2016/0148072 A1 | 5/2016 | Chan et al. |
| 2017/0345185 A1 | 11/2017 | Byron et al. |
| 2017/0371343 A1 | 12/2017 | Cohen et al. |
| 2018/0012085 A1 | 1/2018 | Blayvas et al. |
| 2018/0114078 A1 | 4/2018 | Tokita |
| 2019/0302768 A1* | 10/2019 | Zhang ............... G05D 1/0088 |
| 2019/0317519 A1* | 10/2019 | Chen ..................... G06T 7/344 |
| 2020/0242395 A1 | 7/2020 | Kumar et al. |
| 2022/0080974 A1* | 3/2022 | Han ...................... G06V 20/58 |

FOREIGN PATENT DOCUMENTS

| | | |
|---|---|---|
| CN | 108182393 A | 6/2018 |
| DE | 10 2013 022050 A1 | 6/2015 |
| DE | 102015207055 A1 | 10/2015 |
| EP | 2161677 A1 | 3/2010 |
| EP | 2856205 A1 | 4/2015 |
| JP | 2014-048702 A | 3/2014 |
| JP | 2014-191664 A | 10/2014 |
| WO | 2013/178224 A1 | 12/2013 |

OTHER PUBLICATIONS

Cai, Yingfeng, et al. "Scene-adaptive vehicle detection algorithm based on a composite deep structure." IEEE access 5 (2017): 22804-22811. (Year: 2017).

Sun, Zehang, George Bebis, and Ronald Miller. "On-road vehicle detection: A review." IEEE transactions on pattern analysis and machine intelligence 28.5 (2006): 694-711. (Year: 2006).

Extended European Search Report dated Apr. 20, 2020, issued in counterpart EP Application No. 19214223.0. (11 pages).

Fu et al., "Vision-Based Preceding Vehicle Detection and Tracking.", IEEE Computer Society, International Conference on Pattern Recognition, 2006.

Office Action dated Apr. 28, 2023, issued in counterpart CN Application No. 201911240329.4, with English Translation. (25 pages).

Summons to attend oral proceedings pursuant to Rule 115(1) EPC dated Nov. 11, 2023, issued in counterpart EP Application No. 19214223.0 (11 pages).

* cited by examiner

FIG. 4B
FIRST VEHICLE IMAGE(12a)
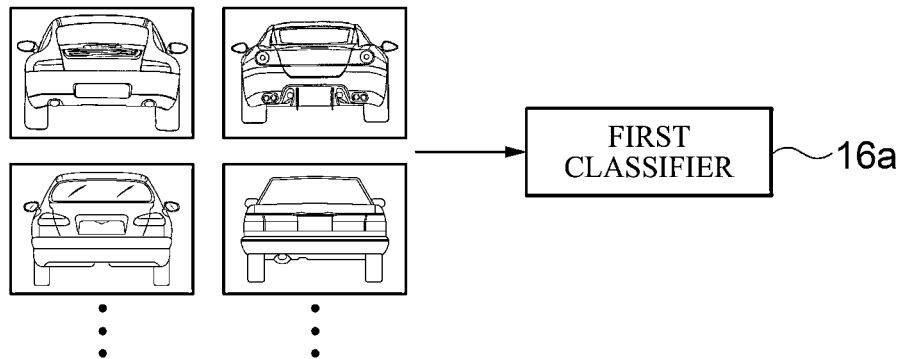
SECOND VEHICLE IMAGE(12b)
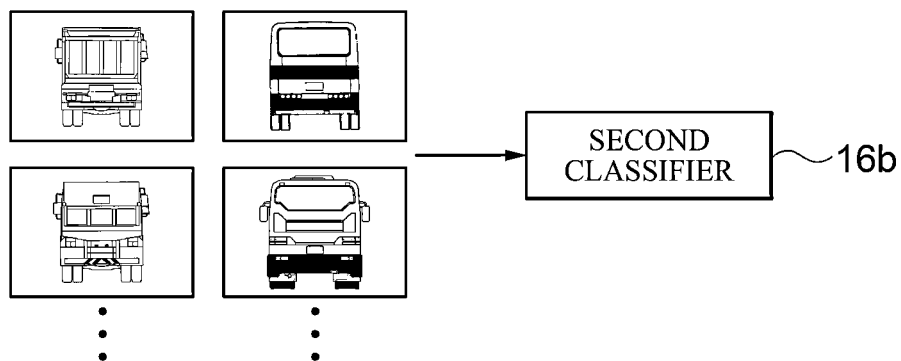
THIRD VEHICLE IMAGE(12c)
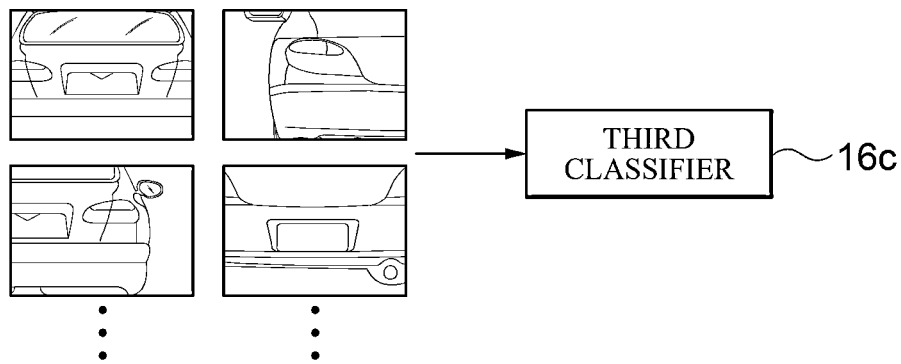

METHOD FOR DETECTING VEHICLE AND DEVICE FOR EXECUTING THE SAME

CROSS-REFERENCE TO RELATED APPLICATION

This application is a continuation application of U.S. patent application Ser. No. 16/705,973 filed on Dec. 6, 2019, which claims the priority and benefit of Korean Patent Application No. 10-2018-0156746 filed on Dec. 7, 2018, and 10-2019-0151276 filed on Nov. 22, 2019, with the Korean Intellectual Property Office, the disclosure of which is incorporated herein by reference.

BACKGROUND OF THE INVENTION

1. Field of the Invention

The present invention relates to a method for detecting a vehicle and an electronic device for executing the method.

2. Description of the Related Art

With the Internet open and laws related to location data modified, the location-based service (LBS) related industry has been activated. As a field of the LBS, vehicle navigation related industries for locating a current location of a vehicle equipped with a device or guiding a movement route to a destination have been activated and vehicle video recorder industry for recording driving images of the vehicle to determine a cause of an accident or an event which occurs has also been activated, so vehicles are increasingly equipped with a digital video recorder or a dashboard camera.

Recently, in addition to a primary function of guiding a route and capturing driving images, application technologies for assisting a driver in driving a vehicle on the basis of various image processing technologies have been developed, and specifically, advanced driver assistance system (ADAS) has been developed and applied to analyze acquired images through various sensors installed in a vehicle and detect objects included in the images to determine driving related information and provide the determined information to a driver.

The ADAS provides guide information to the driver according to a variety of situations, as one the ADAS, a forward vehicle collision warning system (FVCWS) providing guide information to allow a driver to recognize a forward vehicle and maintain an appropriately safe distance with respect to the forward vehicle has been developed and applied.

The FVCWS may recognize in advance a possibility of a collision when a host vehicle is close to a forward vehicle by a predetermined distance while driving, a possibility of a collision with the forward vehicle if the host vehicle maintains a current speed, or an occurrence of an accident due to an accidental factor that may be caused by the forward vehicle and provide corresponding warning information. In addition, technologies for providing driving guide information to the driver on the assumption of recognition of a forward vehicle such as a function of providing information on the departure of the forward vehicle in a state in which the host vehicle is waiting for the light to change or the host vehicle is stopped, besides the collision with the forward vehicle has also been continuously developed.

Therefore, in order to increase accuracy of these technologies, it is essential to accurately detect the forward vehicle from the captured driving images.

SUMMARY

An aspect of the present invention may provide a method of stably and accurately detecting a forward vehicle. An aspect of the present invention may also provide an electronic device supporting safe driving based on a detected forward vehicle and a method of guiding forward vehicle collision of the electronic device.

According to an aspect of the present invention, a method for detecting a vehicle may include: receiving continuously captured front images; setting a search area of the vehicle in a target image based on a location of the vehicle or a vehicle area detected from a previous image among the front images; detecting the vehicle in the search area according to a machine learning model; and tracking the vehicle in the target image by using feature points of the vehicle extracted from the previous image according to a vehicle detection result based on the machine learning model. The search area may be enlarged and set based on the vehicle area detected from the previous image.

The search area may be enlarged and set according to a size of the detected vehicle.

The tracking may include tracking the vehicle by extracting the feature points of the vehicle from the vehicle area detected from the previous image.

The location of the vehicle may be tracked from the target image using the extracted feature points of the vehicle when the vehicle detection based on the machine learning model fails or the reliability of the detected vehicle is below a reference.

The tracking may include tracking the vehicle in parallel with the vehicle detection in the detecting, and terminating the tracking of the vehicle when the vehicle detection based on the machine learning model is successful or when the reliability of the detected vehicle is above the reference.

The method may further include displaying the detected or tracked vehicle according to a predetermined user interface.

The displaying may include displaying a forward vehicle collision related notification based on the vehicle according to the predetermined user interface.

The detecting may further include obtaining a motion vector of the feature points of the vehicle from a plurality of previous images and generating a modified search area based on the motion vectors and the search area and include detecting the vehicle from the modified search area according to the machine learning model.

The motion vector may be generated based on a relationship between positions at which the feature points of the vehicle are expressed in each of the plurality of previous images.

A center position of the modified search area may be determined based on a center position of the search area and the motion vector, and a width of the modified search area may be determined based on a direction or size of the motion vector.

According to another aspect of the present invention, a vehicle detecting apparatus may include: an image input unit receiving continuously captured front images; an area setting unit setting a search area of a vehicle in a target image based on a location of the vehicle or vehicle area detected from a previous image among the front images; a vehicle detecting unit detecting the vehicle from the search area according to a machine learning model; and a vehicle tracking unit tracking the vehicle in the target image using feature points of the vehicle extracted from the previous image according to a vehicle detection result based on the machine learning model.

The search area may be enlarged and set based on the vehicle area detected from the previous image.

The search area may be enlarged and set according to a size of the detected vehicle.

The vehicle tracking unit may track the vehicle by extracting feature points of the vehicle from the vehicle area detected from the previous image.

The vehicle tracking unit may track the location of the vehicle from the target image using the extracted feature points of the vehicle when the vehicle detection based on the machine learning model fails or a reliability of the detected vehicle is below a reference.

The vehicle tracking unit may track the vehicle in parallel with the vehicle detection in the detecting process and terminate the tracking of the vehicle when the vehicle detection based on the machine learning model is successful or when a reliability of the detected vehicle is above the reference.

The vehicle detecting apparatus may further include: an output unit displaying the detected or tracked vehicle according to a predetermined user interface.

The output unit may display a forward vehicle collision related notification based on the vehicle according to the predetermined user interface.

According to another aspect of the present invention, a method of warning a vehicle rear-end collision may include: receiving continuously captured front images; setting a search area of a vehicle in a target image based on a location of the vehicle or a vehicle area detected from a previous image among the front images; detecting the vehicle in the search area according to a machine learning model; tracking the vehicle in the target image by using feature points of the vehicle extracted from the previous image according to a vehicle detection result based on the machine learning model; and determining a possibility of rear-end collision according to a distance to the detected or tracked vehicle and a relative speed.

Technical solutions of the present invention may not be limited to the above, and other technical solutions the present invention will be clearly understandable to those skilled in the art to which the present invention pertains from the disclosures provided below together with accompanying drawings.

According to the present invention, since the entire image is not used as a vehicle detection area, a processing speed may be increased, and a forward vehicle tracked in an augmented reality navigation may be continuously displayed without interruption, thereby providing a stable service to the user.

In addition, by applying the forward vehicle collision warning system (FVCWS) of the intelligent advanced driving assistance system (ADAS), a processing rate of detecting and tracking a vehicle based on the machine learning in detecting a forward vehicle using learned vehicle information may be improved.

DETAILED DESCRIPTION

Figure 1:
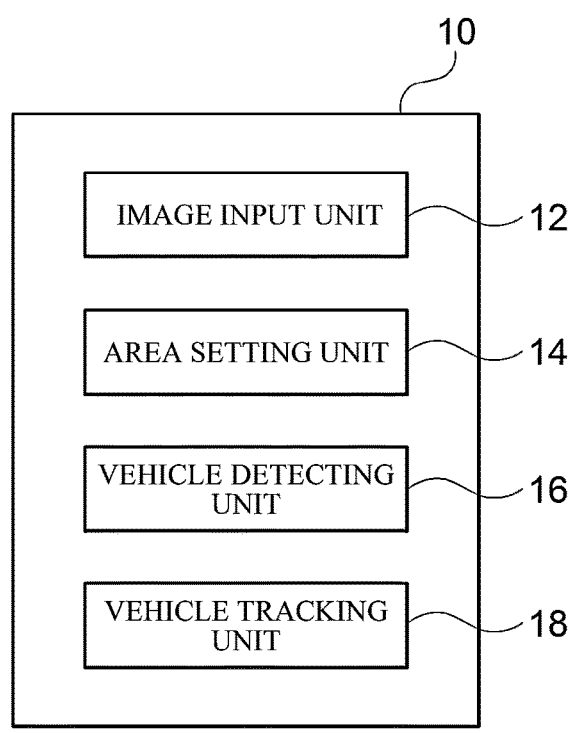
FIG. 1 is a block diagram illustrating an electronic device according to an exemplary embodiment of the present invention.

The following description illustrates only a principle of the present invention. Accordingly, a person skilled in the art may invent various apparatuses implementing the principle of the invention and included in a concept and a scope of the invention even though the apparatuses are not clearly described or illustrated in the present specification. It should be further understood that in principle, all conditional terms and exemplary embodiments which are described in the specification are apparently intended to understand the concept of the invention but the present invention is not limited to the exemplary embodiments and states specifically described in the specification.

The aforementioned objects, characteristics, and advantages will be more apparent through the detailed description below related to the accompanying drawings, and thus those skilled in the art to which the present invention pertains will easily carry out the technical spirit of the present invention.

Further, in the following description, a detailed explanation of a publicly known technology related to the invention may be omitted when it is determined that the detailed explanation may unnecessarily obscure the subject matter of the present invention. Hereinafter, an exemplary embodiment according to the present invention will be described in detail with reference to the accompanying drawings.

The above purpose, characteristics, and advantages of the present invention will now be described more fully with reference to the accompanying drawings. The invention may, however, be embodied in many different forms and in what follows, particular exemplary embodiments of the invention are illustrated in the accompanying drawings and described in detail. Basically, the same reference numbers across the disclosure represent the same constituting elements. In addition, if it is determined that disclosure related to the invention or a specific description about structure of the invention may lead to misunderstanding of the purpose of the invention, the corresponding specific description would be omitted.

Hereinafter, a configuration of an electronic device and a server related to the present invention will be described below in more detail with reference to the accompanying drawings. In the following description, suffixes "module" and "unit" are used only in consideration of facilitating description and do not have meanings or functions discriminated from each other.

The electronic device described in this disclosure may include a cellular phone, a smartphone, a notebook computer, a digital broadcasting terminal, a personal digital assistant (PDA), a portable multimedia player (PMP), a navigation terminal, and so on. Hereinafter, the electronic device assumed to be a navigation terminal.

The traffic-related image, which is a traffic image collected from a user device and other devices (e.g., CCTV, etc.), may be image data including and a still image and video including road congestion information, road surface state information, accident information, a road traffic message (RTM), etc.

Hereinafter, exemplary embodiments of the present invention will be described in detail with reference to the accompanying drawings.

An electronic device 10 according to an exemplary embodiment of the present invention will be described with reference to FIG. 1.

FIG. 1 is a block diagram of an electronic device 10 according to an exemplary embodiment of the present invention.

In the present exemplary embodiment, the electronic device 10 may include an image input unit 12, an area setting unit 14, a vehicle detecting unit 16, and a vehicle tracking unit 18.

The image input unit 12 receives an image captured while a vehicle is driving.

The image input unit 12 may receive a front image directly captured by a camera module included in the electronic device 10. Alternatively, an image related to driving of the vehicle may be directly received from at least one external camera (not shown).

For example, when the electronic device 10 operates as a vehicle navigation device, the image input unit 12 may receive an image captured by a video recorder device of the vehicle.

Specifically, in the present exemplary embodiment, the image acquired by the image input unit 12 may be a video which is continuously captured. That is, front images may be received at a predetermined ratio of frames per second. In addition, the frame rate for receiving the front images may be changed according to various conditions such as a speed of the vehicle, weather of a surrounding environment, and the like.

The area setting unit 14 sets a search area of the vehicle in a target image based on the location of the vehicle or the vehicle area detected from the previous image among the front images.

The area setting unit 14 previously sets an area in which the vehicle is expected to exist so that the vehicle detecting unit 16 may detect the vehicle in the set area, instead of searching for the vehicle in the entire input front image (to be described later).

Specifically, the area setting unit 14 may use information of the vehicle detected from the previous image.

In general, if images are input at a rate of about 30 frames per second and if the forward vehicle does not move very quickly although a speed of the vehicle is counted, the forward vehicle may still be included in a predetermined area based on the position present in the previous image.

Therefore, the area setting unit 14 may set a candidate area for detecting the vehicle of the next image based on the location of the vehicle detected from the previous image.

The candidate area may also be set using the detected area of the vehicle.

Specifically, in the present exemplary embodiment, a size of the forward vehicle may be determined through the detected area of the vehicle, and the search area may be set by extending a width and a height based on the size of the vehicle.

The vehicle detecting unit 16 detects the vehicle in the set search area according to a machine learning model.

Specifically, the vehicle may be detected by a method of learning a Haar algorithm as a method of generating an adaptive detection area in order to increase a processing rate of vehicle detection, and after the detection, the detected area of the vehicle may be expanded and used as a detection area of a next image.

In the present exemplary embodiment, the Haar algorithm, which is based on a theory that a specific feature has a difference between light and shade, used as the learning method is a method of finding a feature using a difference in brightness between areas in an image, and in present exemplary embodiment, a characteristic brightness difference of the vehicle may be learned, based on which a feature may be located to detect the forward vehicle.

In the present exemplary embodiment, as the algorithm used for learning to detect the forward vehicle, various image processing methods other than the Haar algorithm may be used. For example, histogram of oriented gradient (HOG) and local bit pattern (LBP) feature point extracting methods may be used. In addition, Adaboost and support vector machine (SVM) algorithm may be applied as the learning algorithm.

However, in the detection method according to the present exemplary embodiment, vehicle detection may be continuously performed ceaselessly through feature point-based vehicle tracking in case of non-detection in order to compensate for a problem that may occur when the vehicle tracking is performed only by the detection based on the machine learning.

Therefore, if the vehicle tracking unit 18 fails to detect the vehicle in the search area set in the target image, the vehicle tracking unit 18 may extract a feature point from the previous front image or the vehicle area of the previous front image and track the vehicle area using an optical flow.

Figure 8:
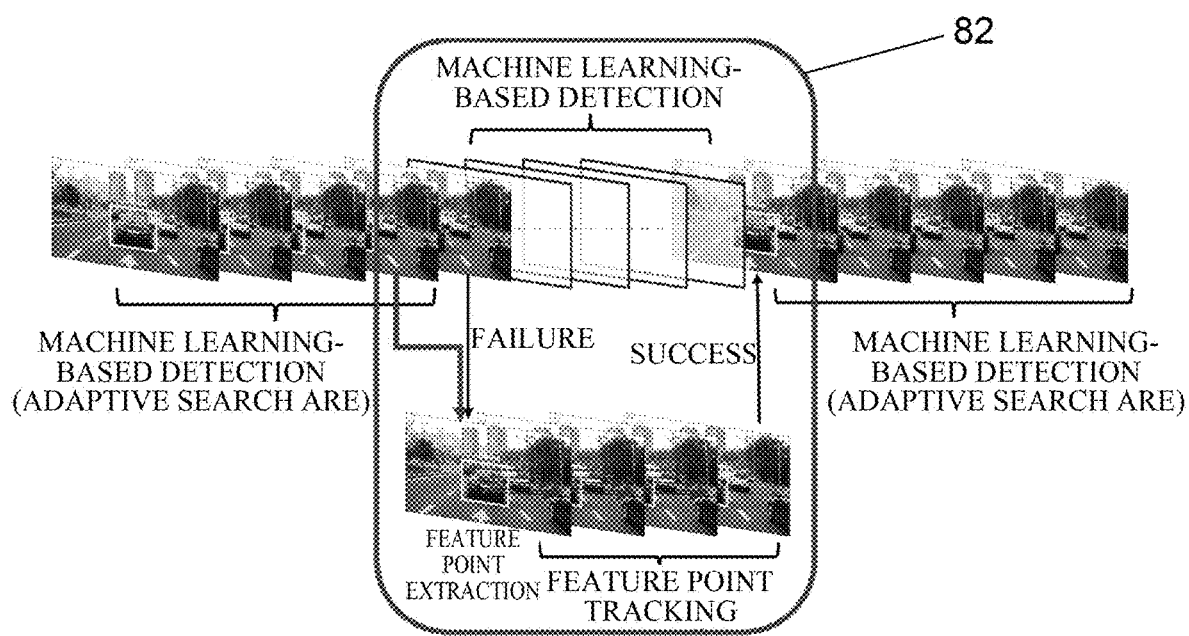
FIG. 8 is an exemplary diagram illustrating vehicle tracking based on vehicle detection and feature point extraction based on a machine learning model in a vehicle detecting method according to an exemplary embodiment of the present invention.

Here, referring to FIG. 8, in the present exemplary embodiment, the vehicle detecting unit 16 may continue to detect the vehicle based on the machine learning simultaneously when the vehicle tracking unit 18 tracks the vehicle area.

That is, the tracking process of the vehicle tracking unit 18 is stopped when the vehicle detecting unit successfully detects the vehicle, an adaptive search area is set with the detected vehicle area, and vehicle detection is continued.

In addition, the vehicle tracking unit 18 may track movement of the forward vehicle using the optical flow.

Hereinafter, a vehicle detecting method according to an exemplary embodiment of the present invention will be described in more detail with reference to FIGS. 2 through 4.

Figure 2:
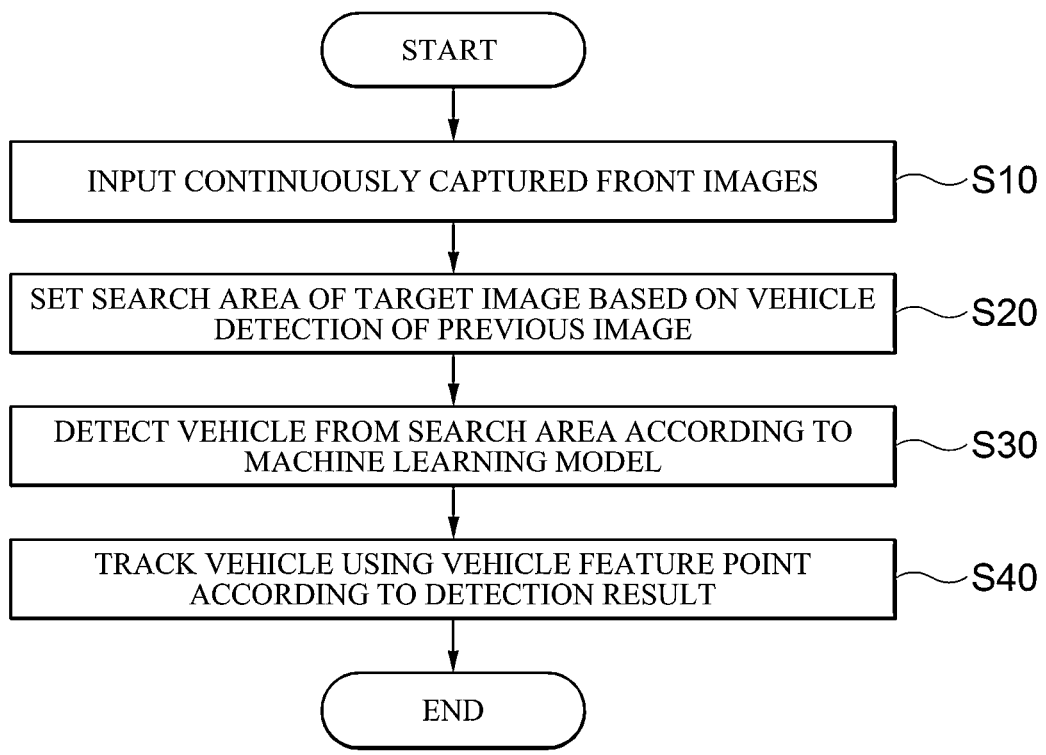
FIG. 2 is a flowchart illustrating a vehicle detecting method according to an exemplary embodiment of the present invention.

FIG. 2 is a flowchart illustrating a vehicle detecting method according to the present exemplary embodiment.

Referring to FIG. 2, the image input unit receives continuously captured front images (S10).

The image input unit 12 receives the front images captured through the camera module according to a determined frame rate.

For example, the front images captured at a rate of 30 frames per second may be continuously received, and if a frame rate for receiving the images is set, the captured front images may be received according to the set frame rate.

The area setting unit 14 sets a search area of the vehicle in a target image based on a location of the vehicle or a vehicle area detected in a previous image among the continuously input front images (S20).

In the present exemplary embodiment, the previous image may be at least one image of the input front images and may include a plurality of images as well as a single image.

In addition, the target image may be an image which is a target of extraction of an object among the input front images.

In the present exemplary embodiment, when the vehicle is detected in the previous image, the area setting unit 14 may set the search area based on the location of the vehicle or the area recognized as the vehicle, and apply the set search area to the target image.

Figure 3:
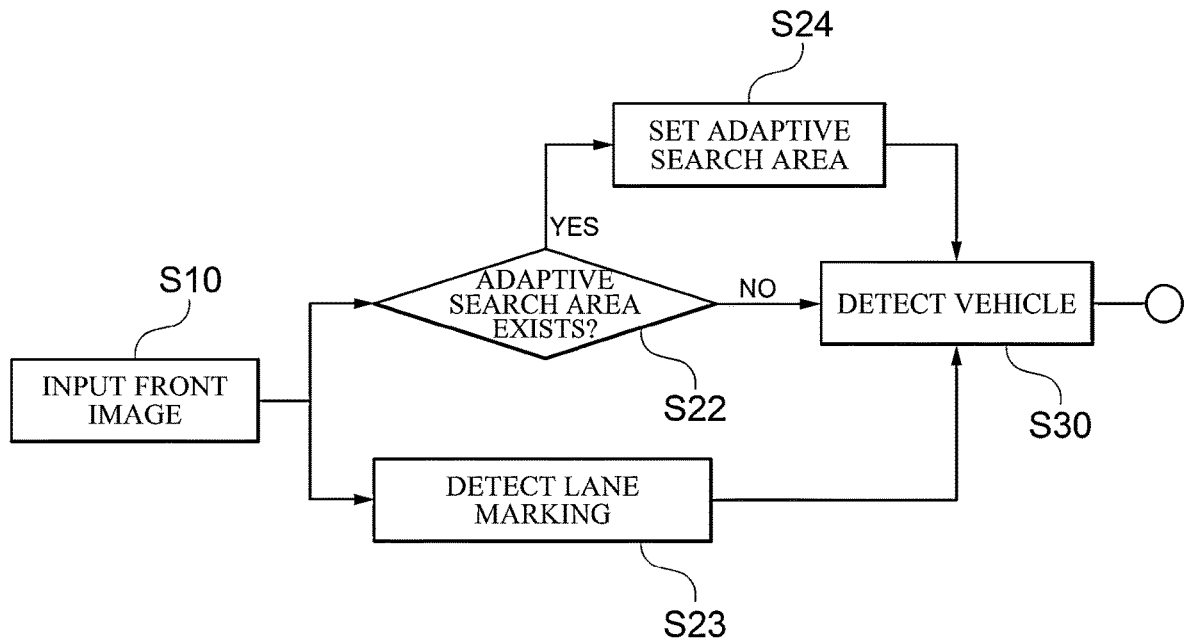
FIGS. 3 through 4C are flowcharts illustrating a vehicle detecting method in detail according to an exemplary embodiment of the present invention.

Specifically, referring to FIG. 3, when the front image is input, the area setting unit 14 may first determine whether an adaptive search area exists (S22).

When the vehicle detection in the previous front image is successful, the area setting unit 14 may adaptively expand the search area according to information of the vehicle detected in the previous front image to generate a search area and set the generated search area to an area in which the vehicle is to be searched from a next target front image.

If the adaptive search area exists, the search area may be set to an area for detecting the vehicle (S24).

When the search area is set, the vehicle detecting unit 16 detects the vehicle from the search area according to the machine learning model (S30).

Referring to FIG. 3, in the detecting of the vehicle (S30), the vehicle is detected from the search area of the front image. Image information of the forward vehicle may be searched according to the machine learning model, an object corresponding thereto may be detected, and the object may be recognized as the forward vehicle.

Further, in the present exemplary embodiment, when setting a candidate area for detecting the vehicle, the candidate area may beset using a detected lane marking (S23). That is, in the present exemplary embodiment, when setting the candidate area for detecting the vehicle in the front image, the vehicle may be efficiently and rapidly detected by setting a driving lane based on a lane marking detected as a range of the area as a detection target area.

Since the lane marking may be defined in a simple, uniform shape compared to the vehicle, the lane marking may be more easily detected from the image and the vehicle detecting unit 16 may also detect the vehicle using the detected lane marking (S30).

Since the vehicle detected in the present exemplary embodiment may be a forward vehicle as a target, the lane marking may be used such that the vehicle in the traffic lane in which the vehicle is currently driving may be detected as the forward vehicle.

In general, since the vehicle exists in the detected traffic lane, the area setting unit 14 may determine the setting of the search area into the driving lane.

Furthermore, in the present exemplary embodiment, the adaptive search area may be adaptively enlarged and set in consideration of a size of the vehicle, and thus may be used to consider a ratio of the vehicle to the lane to determine the size of the vehicle.

Since a width of the lane may be standardized and determined according to a standard of a general road in advance, a type of the vehicle may be determined based on the ratio of the width of the vehicle to the determined width of the lane and may be used for setting the search area.

When there is no adaptive search area generated in advance, the vehicle detecting unit 16 may detect the vehicle according to the machine learning model from the front image without setting the search area (S30).

For example, when the user activates a function of detecting the forward vehicle according to the present exemplary embodiment, since a previous search area has not been generated at a first activation time, the forward vehicle may be detected using the entire front image.

Alternatively, as described above, the search area may be partially limited by using the information of the lane marking in the front image and may be used to first detect the forward vehicle.

Alternatively, a road area may be recognized based on a vanishing point of the front image, and the forward vehicle may be detected in the area.

In addition, in a case where a search area is not present and a vehicle is detected from a first forward image without a search area, a background area and a road area may be distinguished from the entire image, and for the road area, a traffic lane in which the vehicle drives may be first detected and then an object located in a traffic lane may be detected as a forward vehicle.

When the vehicle detecting unit 16 detects a vehicle from the entire first front image, the area setting unit 14 may set a search area of a target image in which a vehicle is to be detected using the adaptive search area generated based on the vehicle detected from the previous image.

Further, in present exemplary embodiment, the vehicle detecting unit 16 may determine whether the vehicle is detected.

That is, even if the search area exists, a case may occur in which the vehicle is not detected due to other optical factors, changes in a surrounding environment, or other errors.

Therefore, according to the vehicle detecting method of the present exemplary embodiment, vehicle detection may continue through vehicle tracking if a forward vehicle is not detected.

The detection of the forward vehicle may be performed as an auxiliary function for safe driving, such as a front collision situation. If detection of a forward vehicle, which actually exists, fails so it is erroneously recognized that the forward vehicle is not present, erroneous operation information may be provided to the user. Therefore, the present exemplary embodiment proposes a method of additionally performing vehicle detection if a vehicle is not detected according to the machine learning model.

Figure 4A:
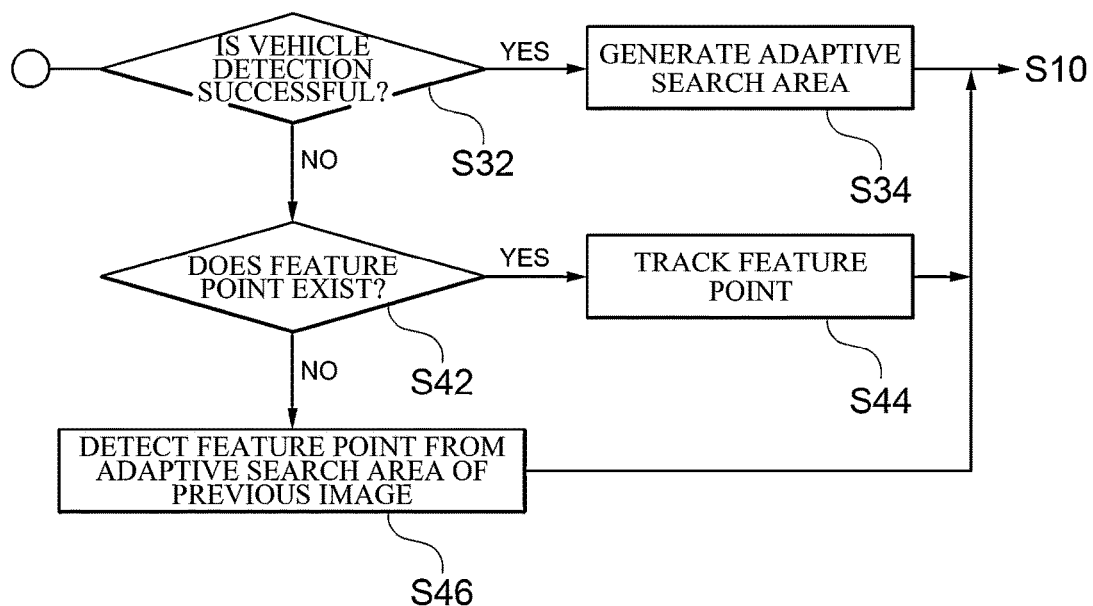

Specifically, referring to FIG. 4A, in the detecting of a vehicle (S30), it is determined whether a forward vehicle is successfully detected (S32), and if the detection is successful, a search area may be adaptively generated through information of the detected vehicle (S34).

However, if the detection of the vehicle based on the machine learning model fails, the vehicle tracking unit 18 may continue to track the vehicle using vehicle feature points.

Therefore, in the tracking (S40), if the vehicle detection based on the machine learning model fails, the vehicle tracking unit 18 may first determine whether there is a feature point from the previously extracted image of the vehicle (S42).

In the present exemplary embodiment, the feature point may be an area including one pixel or a plurality of pixels of an optically characterized image. For example, an area having a brightness greater than a reference value or having a feature value that may be distinguished in comparison with surrounding objects in the image of the forward vehicle detected up to a recent time.

In addition, the feature point may be set to a value which is changed less in the vehicle area of the continuously input front images.

That is, the vehicle tracking unit 18 may set an area which is distinguished from other peripheral objects and which has a feature value changed less in the vehicle area.

If a feature point that satisfies the above condition is set in advance, the vehicle area may be tracked using an optical flow of the feature point (S44).

If a predetermined feature point does not exist, a feature point may be extracted in an adaptive search area of the previous front image (S46) and the feature point extracted from the previous image may be tracked according to an optical flow in a subsequently input front image to recognize a vehicle (S44).

The process of detecting or tracking the vehicle described above may be repeatedly performed according to a continuous input of the front image (S10).

In present exemplary embodiment, the vehicle tracking unit 18 may determine when vehicle detection fails by comparing the detected reliability of the vehicle with a reference value. That is, even if the vehicle is detected by the machine learning model, when the reliability is low compared to the previous image of the vehicle, the vehicle may be tracked using the feature point.

In the present exemplary embodiment, the reliability is used as a reference for determining whether the vehicle tracking unit 18 performs vehicle tracking, and the vehicle tracking unit 18 may determine whether to perform vehicle tracking by determining whether an object detected by the vehicle detecting unit 16 from the image is a vehicle.

For example, the object in the image detected by the vehicle detecting unit 16 may be compared with a predetermined vehicle criterion (e.g., size, shape, color or a conformity degree to an object in the previous image, etc.) to determine that the object is a forward vehicle, and a degree to which the object matches the criteria may be determined as reliability of the recognized object. Therefore, when the reliability of the detected object is less than 50%, for example, the vehicle tracking unit 18 may determine that the vehicle detection fails, and perform vehicle tracking.

In addition, in the present exemplary embodiment, the vehicle detecting unit 16 may directly determine the reliability of the detected object in the image. Therefore, the vehicle detecting unit 16 may determine the reliability of the detected object with respect to the vehicle, and if the reliability is lower than the reference, the vehicle detecting unit 16 may deliver a result of determination that the vehicle detection fails to the vehicle tracking unit 18 so that vehicle tracking may be performed by the vehicle tracking unit 18.

However, in the vehicle detecting method according to the present exemplary embodiment, even when detection fails in the vehicle detecting (S30) and tracking of the vehicle is performed using feature points (S40), vehicle detection based on the machine learning model (S30) is continuously performed.

In other words, in the present exemplary embodiment, performing of vehicle detection based on the machine learning model is basically set, and vehicle tracking based on an optical flow may be additionally performed to recognize movement of the forward vehicle continuously even when vehicle detection based on the machine learning model fails.

Therefore, if the vehicle detection fails while continuously performing the vehicle detection based on the machine learning model, vehicle tracking based on the optical flow may be additionally performed, and if vehicle detection again based on the machine learning model is successful, the vehicle tracking based on the optical flow may be stopped and only the vehicle detection operation based on the machine learning model may be performed.

In addition, in the present exemplary embodiment, when the detecting of the vehicle (S30) is performed together with the tracking of the vehicle (S40), a tracking result of the vehicle may be further used.

That is, the detecting of the vehicle (S30) may use the information of the feature point determined in the process of tracking the vehicle when the adaptive search area is set to increase a success rate of the vehicle detection.

Specifically, in the detecting of the vehicle (S30), a motion vector of the feature point of the vehicle may be obtained from a plurality of previous images.

That is, the area setting unit 14 may calculate an optical flow as a motion vector and reflect the motion vector in the adaptive search area generated in the previous image.

Therefore, in the setting of the area (S20), a modified search area may be generated based on the motion vector and the search area. Specifically, an expansion value of the search area may be determined according to a size and direction of the motion vector and a modified search area may be generated.

Thereafter, in the detecting of the vehicle (S30), vehicle detection may be performed in the modified search area based on the machine learning model and a detection probability of the vehicle may be further increased.

In addition, when the vehicle is detected based on the machine learning model in the detecting the vehicle (S30) in the present exemplary embodiment, a classifier separately trained according to a size of the vehicle or a characteristic of a distance to the forward vehicle may also be used.

Specifically, in order to increase vehicle detection performance based on the machine learning, classifiers generated after classifying databases storing images of the vehicle into a general passenger vehicle and a large vehicle and learning the same may be used.

In addition, in order to increase short-range vehicle detection, a classifier which has trained only an image of a tail light side, rather than the entire vehicle image, may also be used.

Referring to FIG. 4B, in present exemplary embodiment, three classifiers may be trained.

For example, a first classifier 16a may be trained using a first vehicle image 12a.

Specifically, the first vehicle image 12a is an image of a general passenger vehicle, and the first classifier 16a may perform the machine learning using the image of the general passenger vehicle and improve classification performance for the general passenger vehicle.

A second classifier 16b may be trained using a second vehicle image 12b.

In this case, unlike the first vehicle image 12a, the second vehicle image 12b may be a rear image of a vehicle such as a bus or a truck as a large vehicle.

Therefore, the second classifier 16b trained with the second vehicle image 12b may have high classification performance for a large vehicle.

In addition, a third classifier 16c may be separately trained in consideration of a feature based on a distance to a forward vehicle, not the size of the vehicle.

That is, a third vehicle image 12c obtained for a vehicle located very nearby may include only information on a partial area, rather than the entire image of the vehicle such as the first vehicle image 12a and the second vehicle image 12b.

Therefore, in the present exemplary embodiment, the third classifier 16c may be trained using the separate image including only the partial area as a learning image.

Through the above process, the vehicle may be detected more accurately using the classifiers individually trained according to the image features based on the size of each vehicle or the distance to the forward vehicle.

Figure 4C:
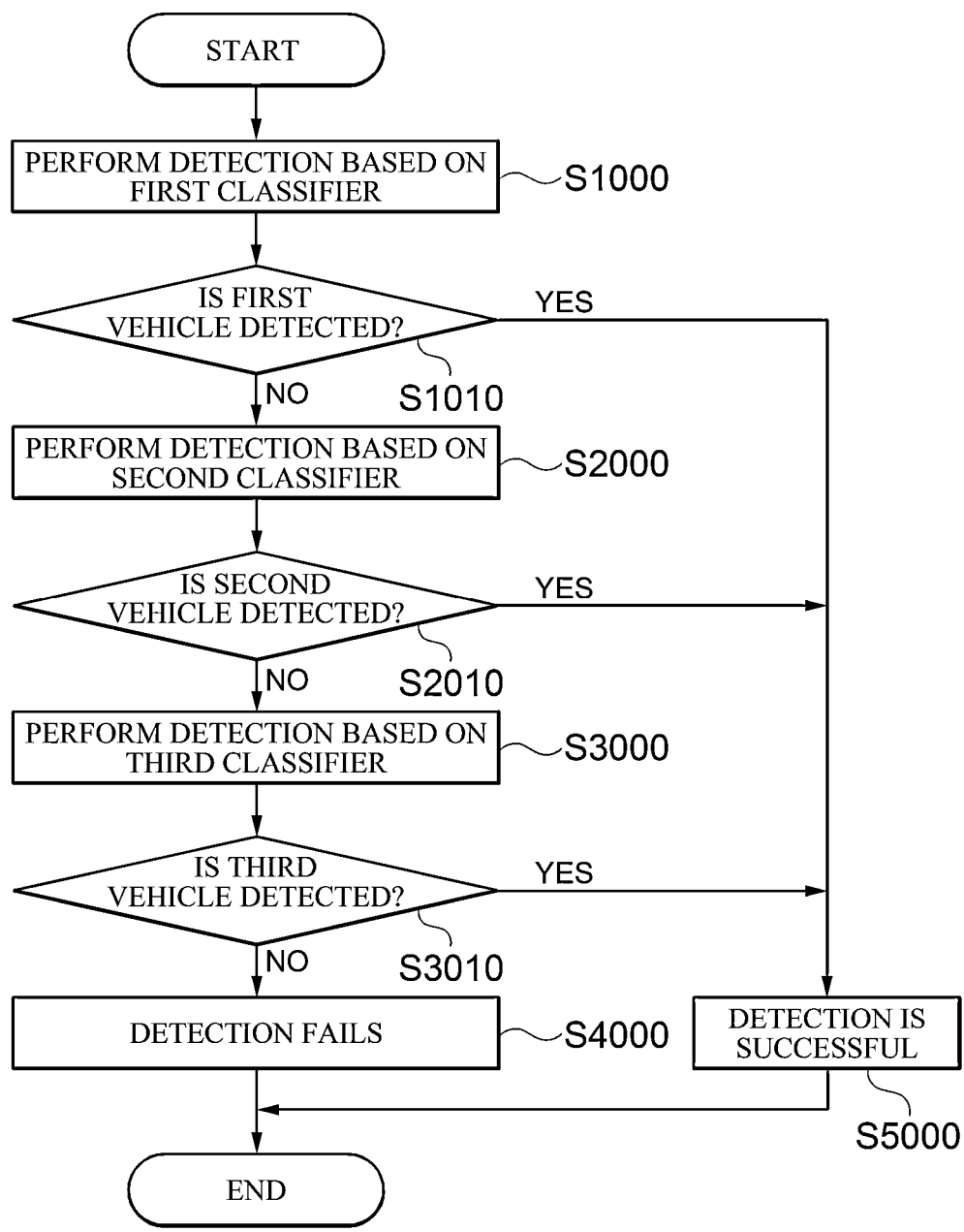

A detailed method of detecting a vehicle will be described in more detail with reference to FIG. 4C.

When detection is performed using a machine-trained classifier in the detecting of the vehicle (S30) described above, a plurality of individually classified classifiers may be sequentially used.

Therefore, first, detection based on the first classifier is performed (S1000).

A detection result is checked (S1010) and if a first vehicle is classified by the first classifier trained according to the first vehicle image, the detecting of the vehicle (S30) may be terminated because the detection is successful (S5000).

However, if the first vehicle is not detected, detection based on the second classifier may be performed (S2000).

A detection result is checked (S2010) and if a second vehicle is detected by the second classifier trained according to the second vehicle image, the detecting of the vehicle (S30) may be terminated because the detection is successful (S5000). However, if the second vehicle is not detected even by the second classifier, detection may be performed by the third classifier (S3000).

Finally, when a vehicle is detected by the third classifier (S3010), the detecting of the third vehicle located nearby (S3010) may be terminated because the detection is successful (S5000).

If a vehicle is not detected even by the third classifier, since the detection fails (S4000), a process of tracking a vehicle based on a feature point may be performed in the tracking of the vehicle (S40).

In addition, in the above exemplary embodiment, it is described that the detection process according to each classifier is sequentially performed, but when parallel processing is possible, inputting to the classifier may be performed at the same time and the classification results may be collected to generate an optimal detection result.

In the case of a vehicle close nearby such as the third classifier, it is necessary to preferentially detect the vehicle according to safety requirements, so that the detection based on the third classifier may be performed with priority.

Hereinafter, setting of an adaptive search area according to the present exemplary embodiment will be described in more detail with reference to FIGS. 5 through 8.

Figure 5:
FIGS. 5 through 7 are exemplary diagrams illustrating setting of an adaptive search area according to an exemplary embodiment of the present invention.

FIG. 5 is a diagram illustrating an example of detecting a vehicle from an input front image 1000 according to an exemplary embodiment.

Referring to FIG. 5, the vehicle detecting unit 16 may detect a vehicle 1200 from an input front image 1000. In present exemplary embodiment, the vehicle is detected from an adaptive search area, but as described above, if there is no search area generated as the first front image, the vehicle may be detected from the entire front image.

For example, in the case of a first time point at which a vehicle detection function is activated, the adaptive search area is not set, so that the object determined as the forward vehicle may be detected in the entire image.

In addition, the vehicle detecting unit 16 may more easily detect the forward vehicle using lane information 1105 in a road as described above.

When the vehicle is detected in the above process, the vehicle detecting unit 16 may calculate width w and height h information of an object 1200 determined as the vehicle. The area setting unit 14 may set the adaptive search area using the calculated width and height.

Figure 6:
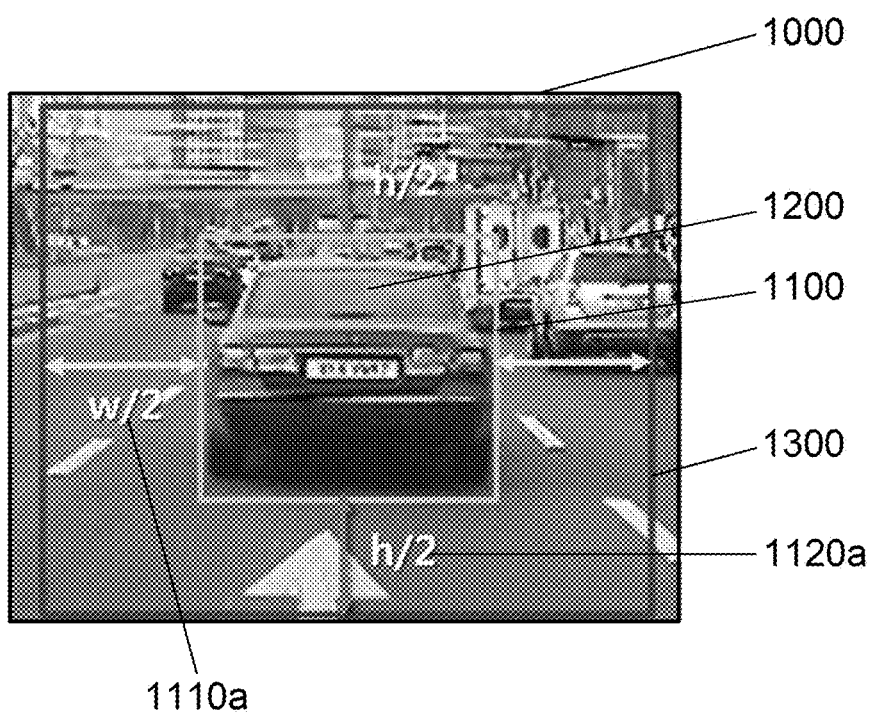

Referring to FIG. 6, in the present exemplary embodiment, the area setting unit may expand a search area according to height and width values of the vehicle in an area 1100 in which the vehicle 1200 is determined to exist in a previous image to adaptively generate a search area 1300 in the front image.

In the present exemplary embodiment, the area expanded in four directions by half (w/2) of the width and half (h/2) of the height is set as the adaptive search area.

The area setting unit 14 may set the adaptive search area on the assumption that the vehicle will be located in the expanded adaptive search area unless there is a sudden change in the speed of the vehicle in the continuously input image in consideration of a frame rate.

For example, if an image received in the image input unit 12 is 30 frames per second, it is included in an area range of a previous image unless movement of the forward vehicle is very large.

Therefore, when the vehicle is detected in the first image in which the forward vehicle first appears, a search area enlarged according to the detected vehicle width or height is set, and this area is designated as a search area for vehicle detection in a next successive image. If this process is repeatedly performed, the search area is adaptively changed according to the size or location of the detected vehicle.

The adaptive search area set in the present exemplary embodiment is based on the size of the vehicle, but the size may be determined using a frame rate of the input image, and in addition, the information such as the speed of the vehicle, a driving direction of the vehicle, and the like may also be additionally considered.

For example, when a speed difference with the forward vehicle is large, the adaptive search area may be further enlarged, and the search area may be enlarged even when the vehicle is making a curve.

Furthermore, in the present exemplary embodiment, if the curve is a sudden curve with a predetermined curvature or greater, a vehicle in a next lane may be recognized as a forward vehicle. Therefore, it is also possible to accurately recognize the vehicle located in the current driving lane as a forward vehicle by utilizing a lane detection result together with the adaptive search area.

Figure 7:
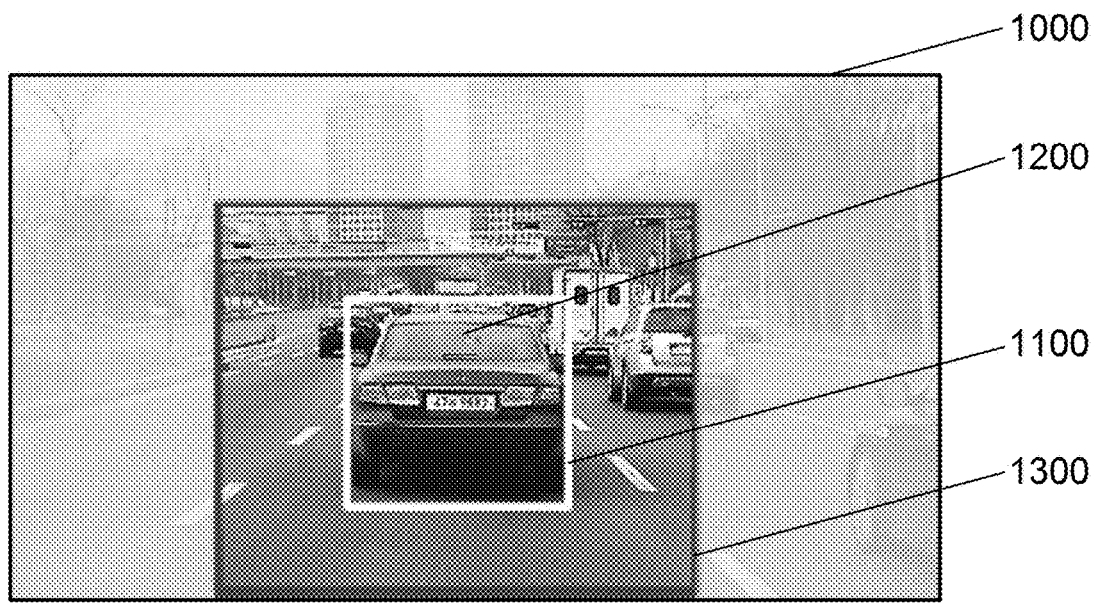

As described above, when the adaptive search area 1300 is set according to the area 1100 in which the vehicle 1200 exists as illustrated in FIG. 7, the vehicle detecting unit 16 may detect the vehicle in a partial area of the input front image 1000.

When the search area of the front image used for detecting a first forward vehicle in FIG. 5 is compared with the search area of the front image in FIG. 7, the candidate area 1300 in which a forward vehicle is expected to exist is set and vehicle detection is performed only in the set range according to the machine learning model in FIG. 7, the forward vehicle may be more rapidly and accurately detected.

Meanwhile, if the vehicle detection fails in the search area set in the front image as described above, a feature point is extracted from a previous vehicle area and a vehicle area is tracked using an optical flow, and at the same time, vehicle detection based on the machine learning is also performed.

When a vehicle is detected again in the front image using the machine learning model, vehicle tracking using the feature point is stopped and vehicle detection continues to be performed in the search area.

Referring to FIG. 8, a vehicle is detected by continuously setting an adaptive search area according to the machine learning model, and when a vehicle is not detected from a front image, a process of tracking a vehicle through feature point extraction may be simultaneously performed (82).

The vehicle detecting method according to the present exemplary embodiment described above has the advantage that a processing speed is faster because the entire image is not used as a vehicle detection area and the forward vehicle tracking in an augmented reality navigation may be continuously displayed to thereby provide a stabilized service to the user.

Meanwhile, such an electronic device 10 may be implemented as one module of an advanced driver assistance system (ADAS) or a system 100 for autonomous driving to perform route guide and forward vehicle collision warning system (FVCWS). This will be described in more detail with reference to FIGS. 9 and 10.

Figure 9:
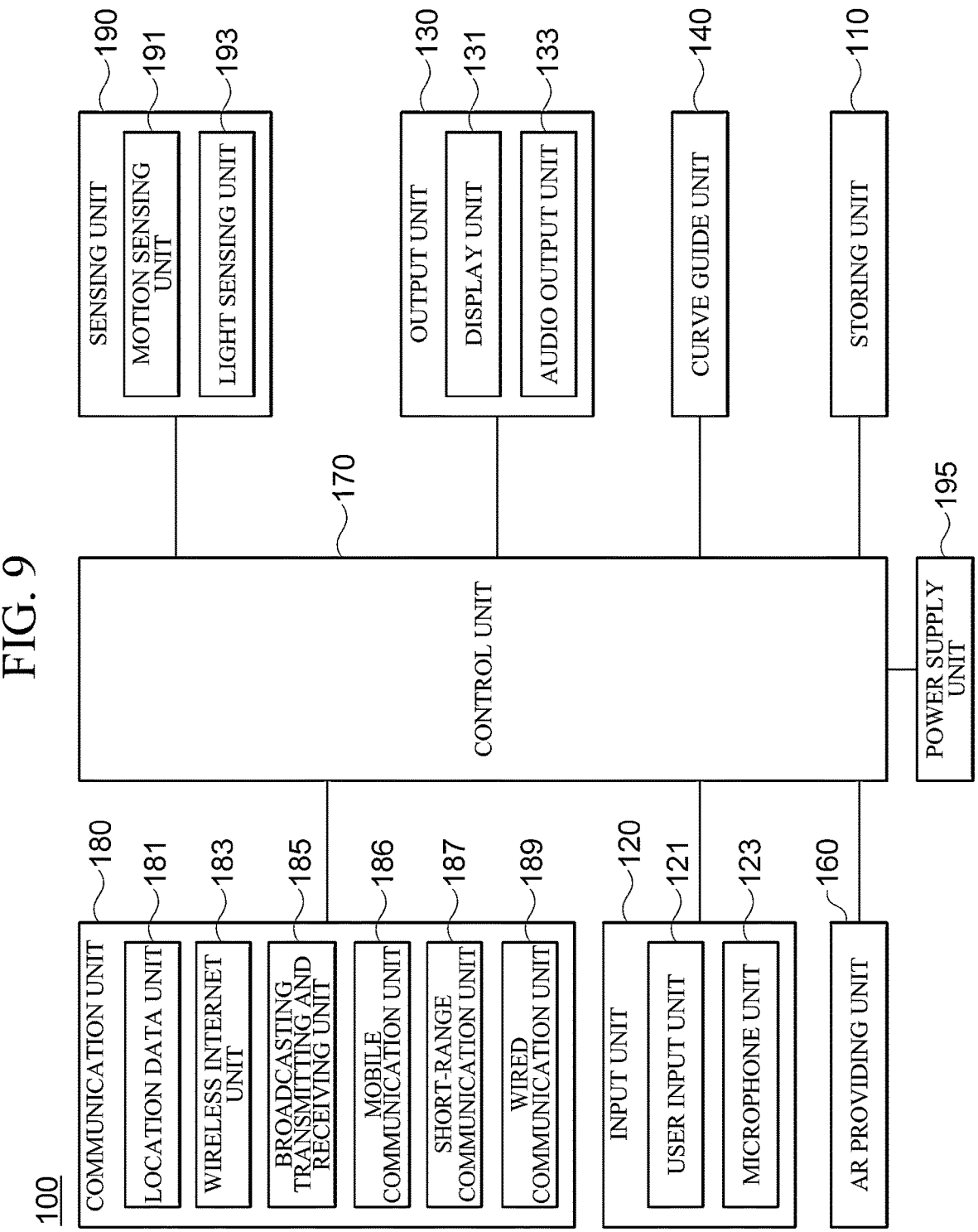
FIG. 9 is a block diagram illustrating a system according to an exemplary embodiment of the present invention.

FIG. 9 is a block diagram illustrating a system according to an exemplary embodiment of the present invention. Referring to FIG. 9, the system 100 includes all or some of a storage unit 110, an input unit 120, an output unit 130, a curve guide unit 140, an augmented reality (AR) providing unit 160, a controller 170, a communication unit 180, a sensing unit 190, and a power supply unit 195.

Here, the system 100 may be implemented by various devices such as a smartphone, a tablet computer, a laptop computer, a personal digital assistant (PDA), a portable multimedia player (PMP), smart glasses, project glasses, navigation which may provide driving-related guide to a driver of a vehicle, a digital video recorder, a car dash cam, or a car video recorder which are imaging devices for vehicle, and the like, and may be provided in a vehicle.

Driving-related guide may include various guide for assisting a driver in driving a vehicle such as route guide, lane departure guide, lane keeping guide, forward vehicle departure guide, traffic light change guide, forward vehicle collision warning guide, traffic lane change guide, traffic lane guide, curve guide, and the like.

Here, the route guide may include augmented reality (AR) route guide to perform route guide by combining various information such as a position, a direction, and the like of the user to a captured image of a front side of a vehicle in operation and 2-dimensional (2D) or 3-dimensional (3D) route guide to perform route guide by combining various information such as the user's location, direction, and the like to 2D or 3D map data.

In addition, the route guide may include an aerial map route guide to perform route guide by combining various information such as a user's location, direction, and the like to aerial map data. Here, the route guide may be interpreted as a concept including not only the route guide of a case where the user gets in a vehicle to drive the vehicle but also a route guide of a case where the user walks or runs to move.

In addition, the lane departure guide may guide/notify a driving vehicle of whether or not the driving vehicle is out of a lane.

In addition, the lane keeping guide may guide the vehicle to return to the lane in which the vehicle is originally driving.

In addition, the forward vehicle departure guide may guide departure of a vehicle located in front of a vehicle being stopped.

In addition, the traffic light change guide may guide/notify the vehicle of whether or not a signal of a traffic light located in front of the vehicle being stopped is changed. For example, the traffic light change guide may guide a change in a traffic light from a red traffic light indicating a stop signal to a blue traffic light indicating a start signal.

In addition, the forward vehicle collision warning guide may guide that a distance to a vehicle located in front of a vehicle being stopped or driving is within a certain distance to prevent a collision with the forward vehicle.

Specifically, in the present exemplary embodiment, the distance between the forward vehicle and the current vehicle is calculated through the machine learning model or feature point extraction and a collision prevention guide may be provided accordingly.

In addition, the traffic lane change guide may guide a vehicle from a traffic lane in which the vehicle is located to another traffic lane to guide a route to a destination. In the present exemplary embodiment, it is also possible to additionally determine whether a forward vehicle exists in a traffic lane to which the current vehicle is to move, and provide corresponding change guide.

In addition, the traffic lane guide may guide the vehicle in a traffic lane in which the current vehicle is located.

In addition, the curve guide may guide/notify the vehicle that a road on which the vehicle will drive after a predetermined time is a curve.

A driving-related image, such as a front image of a vehicle that enables provision of various guide, may be captured by a camera mounted in a vehicle or a camera of a smartphone. Here, the camera may be a camera formed integrally with the system 100 mounted in the vehicle and imaging the front of the vehicle.

As another example, the camera may be a camera mounted in the vehicle separately from the system 100 to image the front of the vehicle. In this case, the camera may be a separate vehicle image capturing device mounted toward the front of the vehicle, and the system 100 may receive a captured image through wired/wireless communication with the vehicle image capturing device mounted separately or receive a captured image of the vehicle image capturing device when a storage medium storing the captured image is inserted into the system 100.

Hereinafter, the system 100 according to an exemplary embodiment of the present invention will be described in more detail based on the above description.

The storage unit 110 functions to store various data and applications required for the operation of the system 100. In particular, the storage unit 110 may store data necessary for the operation of the system 100, for example, an OS, a route search application, map data, and the like. In addition, the storage unit 110 may store data generated by the operation of the system 100, for example, searched route data, a received image, and the like.

The storage unit 110 may be implemented as an internal storage such as a random access memory (RAM), a flash memory, a read only memory (ROM), erasable programmable ROM (EPROM), electronically erasable and programmable ROM (EEPROM), a register, a hard disk, a removable disk, a memory card, a universal subscriber identity module (USIM), or the like, as well as a removable storage such as a USB memory.

The input unit 120 functions to convert a physical input from the outside of the system 100 into a specific electrical signal. Here, the input unit 120 may include all or some of a user input unit 121 and a microphone unit 123.

The user input unit 121 may receive a user input such as a touch or a push operation. Here, the user input unit 121 may be implemented using at least one of various types of buttons, a touch sensor receiving a touch input, and a proximity sensor receiving an approaching motion.

The microphone unit 123 may receive a user's voice and sound generated in and outside the vehicle.

An output unit 130 is a unit for outputting data of the system 100 to the user, as image and/or sound. Here, the output unit 130 may include all or some of a display unit 131 and an audio output unit 133.

The display unit 131 is a unit for outputting data which may be visually recognized by the user. The display unit 131 may be implemented as a display unit provided on a front surface of a housing of the system 100. In addition, the display unit 131 may be formed integrally with the system 100 to output visual recognition data or may be installed separately from the system 100, such as a head up display (HUD), to output visual recognition data.

The audio output unit 133 is a unit for outputting data that may be recognized acoustically by the system 100. The audio output unit 133 may be implemented as a speaker that expresses data of the system 100 to be reported to the user, as a sound.

A curve guide unit 140 may perform a function of the curve guidance, described above. Specifically, the curve guide unit 140 may obtain link information corresponding to a road on which the vehicle drives, determine a location of the vehicle at a link at a future time point, and determine a risk of a curve section in which the vehicle is to drive after a predetermined time using the determined location and a vehicle speed at a reference time point.

The AR providing unit 160 may provide an AR view mode. Here, AR refers to a method of providing additional information (e.g., a graphic element indicating a point of interest (POI), a graphic element guiding a curve, and various additional information for assisting a driver in driving safe, etc.) visually in an overlapping manner on a screen containing a real world that the user actually views.

The AR providing unit 160 may include all or some of a calibration unit, a 3D space generating unit, an object generating unit, and a mapping unit.

The calibration unit may perform a calibration for estimating a camera parameter corresponding to the camera from an image captured by the camera. Here, the camera parameter is a parameter constituting a camera matrix which is information indicating a relationship in which an actual image space is formed on a picture, and may include extrinsic parameters and intrinsic parameters.

The 3D space generating unit may generate a virtual 3D space based on the image captured by the camera. Specifically, the 3D space generating unit may generate a virtual 3D space by applying a camera parameter estimated by the calibration unit to a 2D captured image.

The object generating unit may generate an object for guiding in AR, for example, a route guide object, a front collision warning guide object, a traffic lane change guide object, a lane departure guide object, a curve guide object, and the like.

The mapping unit may map an object generated by the object generating unit to a virtual 3D space generated by the 3D space generating unit. Specifically, the mapping unit may determine a position in the virtual 3D space of the object generated by the object generating unit and map the object to the determined position.

Meanwhile, the communication unit 180 may be provided for the system 100 to communicate with other devices. The communication unit 180 may include all or some of a location data unit 181, a wireless internet unit 183, a broadcast transceiver unit 185, a mobile communication unit 186, a short-range communication unit 187, and a wired communication unit 189.

The location data unit 181 is a device for obtaining location data through a global navigation satellite system (GNSS). GNSS refers to a navigation system that may calculate a location of a receiver terminal using radio signals received from satellites. Specific examples of GNSS include global positioning system (GPS), Galileo, global orbiting navigational satellite system (GLONASS), COMPASS, Indian regional navigational satellite system (IRNSS), quasi-zenith satellite system (QZSS), and the like depending on an operating subject. The location data unit 181 of the system 100 according to an exemplary embodiment of the present disclosure may obtain location data by receiving a GNSS signal provided in an area where the system 100 is used. Alternatively, the location data unit 181 may obtain location data through communication with a base station or an access point (AP) in addition to the GNSS.

The wireless Internet unit 183 is a unit for accessing the wireless Internet to obtain or transmit data. The wireless Internet unit 183 may access the Internet through various communication protocols defined to perform wireless data transmission and reception of wireless LAN (WLAN), wireless broadband (Wibro), world interoperability for microwave access (Wimax), and high speed downlink packet access (HSDPA).

The broadcast transceiver unit 185 is a unit for transmitting and receiving broadcast signals through various broadcast systems. Broadcast systems that may transmit and receive signals through the broadcast transceiver unit 185 include digital multimedia broadcasting terrestrial (DMBT), digital multimedia broadcasting satellite (DMBS), media forward link only (MediaFLO), digital video broadcast handheld (DVBH), integrated services digital broadcast terrestrial (ISDBT), and the like. The broadcast signals transmitted and received through the broadcast transceiver unit 185 may include traffic data, living data, and the like.

The mobile communication unit 186 may perform voice and data communication by accessing a mobile communication network according to various mobile communication standards such as 3rd generation (3G), 3rd generation partnership project (3GPP), long term evolution (LTE), and the like.

The short-range communication unit 187 is a unit for near field communication. As described above, the short-range communication unit 187 may perform communication through Bluetooth, radio frequency identification (RFID), infrared data association (IrDA), ultra wideband (UWB), ZigBee, near field communication (NFC), and wireless-fidelity (Wi-Fi).

The wired communication unit 189 is an interface unit that may connect the system 100 to another device by wire. The wired communication unit 189 may be a USB module capable of communicating through a USB port.

The communication unit 180 may communicate with another device using at least one of the location data unit 181, the wireless Internet unit 183, the broadcast transceiver unit 185, the mobile communication unit 186, the short-range communication unit 187, and the wired communication unit 189.

As an example, when the system 100 does not have a camera function, an image captured by an image capture unit for a vehicle such as a digital video recorder, a car dash cam, or a car video recorder may be received using at least one of the short-range communication unit 187 and the wired communication unit 189.

As another example, in the case of communicating with a plurality of devices, any one may communicate with the short-range communication unit 187, and the other may communicate with the wired communication unit 119.

The sensing unit 190 is a unit that may detect a current state of the system 100. The sensing unit 190 may include all or some of a motion sensing unit 191 and a light sensing unit 193.

The motion sensing unit 191 may detect a motion in a three-dimensional space of the system 100. The motion sensing unit 191 may include a 3-axis geomagnetic sensor and a 3-axis acceleration sensor. By combining motion data obtained through the motion sensing unit 191 with location data obtained through the location data unit 181, a trace of a vehicle to which the system 100 is attached may be more accurately calculated.

The light sensing unit 193 is a unit for measuring ambient illuminance of the system 100. Using the illuminance data acquired through the light sensing unit 193, brightness of the display unit 131 may be changed to correspond to ambient brightness.

The power supply unit 195 is a device for supplying power necessary for an operation of the system 100 or an operation of other devices connected to the system 100. The power supply unit 195 may be a battery built in the system 100 or a unit that receives power from an external power source such as the vehicle. In addition, the power supply unit 195 may be implemented as a wired communication unit 119 or a device that is wirelessly supplied according to a form of receiving power.

The controller 170 controls an overall operation of the system 100. Specifically, the controller 170 may control all or some of the storage unit 110, the input unit 120, the output unit 130, the curve guide unit 140, the AR providing unit 160, the communication unit 180, the sensing unit 190, and the power supply unit 195.

In particular, the controller 170 may acquire link information corresponding to a road on which the vehicle will drive. Here, the link information may be obtained from route guide data for route guide to a destination.

For example, when destination information is input through the input unit 120, the controller 170 may generate route guide data to a destination using map data previously stored in the storage unit 110. Alternatively, when destination information is input through the input unit 120, the controller 170 may transmit a route guide request including at least one of current location information and destination information to the server. The controller 170 may receive route guide data from the server according to the route guide request. In this case, the controller 170 may obtain link information corresponding to a road on which the vehicle drives from the route guide data.

In addition, when an estimated driving route information of the vehicle is generated based on real-time location information of the vehicle, the controller 170 may obtain link information based on the generated information.

Meanwhile, the controller 170 may provide forward vehicle collision warning guide information according to an exemplary embodiment of the present invention. That is, the controller 170 may detect a forward vehicle from an input front image and provide guide information according to a distance of the detected forward vehicle and a speed of the current vehicle and the forward vehicle. In this case, the controller 170 may additionally calculate the distance and the relative speed in the determination process of FIGS. 1 to 4.

That is, the controller 170 may calculate the relative speed of the forward vehicle in consideration of a change of the distance to the vehicle in the input front image and a frame rate and generate front collision warning guide information by comparing the relative speed of the forward vehicle with the speed of the current vehicle.

The controller 170 may control the output unit 130 to output necessary deceleration information according to a determination result. In addition, the controller 170 may calculate acceleration information necessary for specific deceleration.

In the present exemplary embodiment, required acceleration $A_{req}(t)$ for deceleration at a current time t may be calculated using acceleration $A_{TV}$ of the forward vehicle $V_{TV}$, the relative speed $V_r(t)$, $V_r(t)=V_{TV}(t)-V_{SV}(t)$ between the forward vehicle $V_{TV}$ and the driving vehicle $V_{SV}$, and the distance $X_c(t)$ between the forward vehicle and the driving vehicle (See Equation below).

$$A_{req}(t) = A_{TV} + \frac{(V_r(t))^2}{2*(x_c(t) - x_r(t))} \quad \text{[Equation]}$$

Further, the distance to the forward vehicle may be calculated by further considering a driving distance $X_r(t)$ for a time required for the driver to react to control a brake for deceleration.

In addition, in the present exemplary embodiment, in the case of a cut-in vehicle which changes lanes to the driving lane in addition to the forward vehicle in the movement traffic lane of the driving vehicle, the controller may determine whether to calculate a required acceleration for forward vehicle collision warning in consideration of a lateral distance of the driving vehicle and the forward vehicle.

Specifically, when detecting the cut-in vehicle that changes lanes, it may be determined whether to calculate the required acceleration by comparing a vehicle width of the driving vehicle with a lateral distance between the center lines of both vehicles.

The controller 170 may control the output unit 130 by stages according to the required acceleration calculated through the above process.

If the required acceleration is a first level, the controller 170 may control the output unit 130 to output a first deceleration guide. Here, the first level may be a numerical value indicating that the user needs to decelerate preliminarily.

Here, the numerical value representing the need for deceleration may be calculated in consideration of the distance between the driving vehicle and the forward vehicle, the speed of the vehicle, and the number of lanes.

If the required acceleration is a second level, the controller 170 may control the output unit 130 to output a second deceleration guide. Here, the second level may be a numerical value indicating that the user needs a higher degree of deceleration.

If the required acceleration is lower than the first level or if the speed of the driving vehicle is lower than a reference speed, the controller 170 may control the output unit 130 not to output a deceleration guide.

In addition, the controller 170 may divide the required acceleration into three or more steps to provide the user with a deceleration guide suitable for a situation of each step.

In addition, the controller 170 may determine a condition having priority over the forward vehicle collision warning and control the output unit 130 not to output the deceleration guide even if the acceleration exceeds the determined level.

Specifically, the priority condition may be considered with priority in a case where the forward vehicle changes lanes, a case where a route is re-navigated, or in a case where an event occurs in the driving lane after branching.

Meanwhile, the deceleration guide may be performed in an AR screen. Specifically, the AR providing unit 160 may generate a forward vehicle collision warning guide object and map the generated forward vehicle collision warning guide object to a virtual 3D space to generate an AR screen and the controller 170 may control the display unit 131 to display the generated AR screen.

Figure 10:
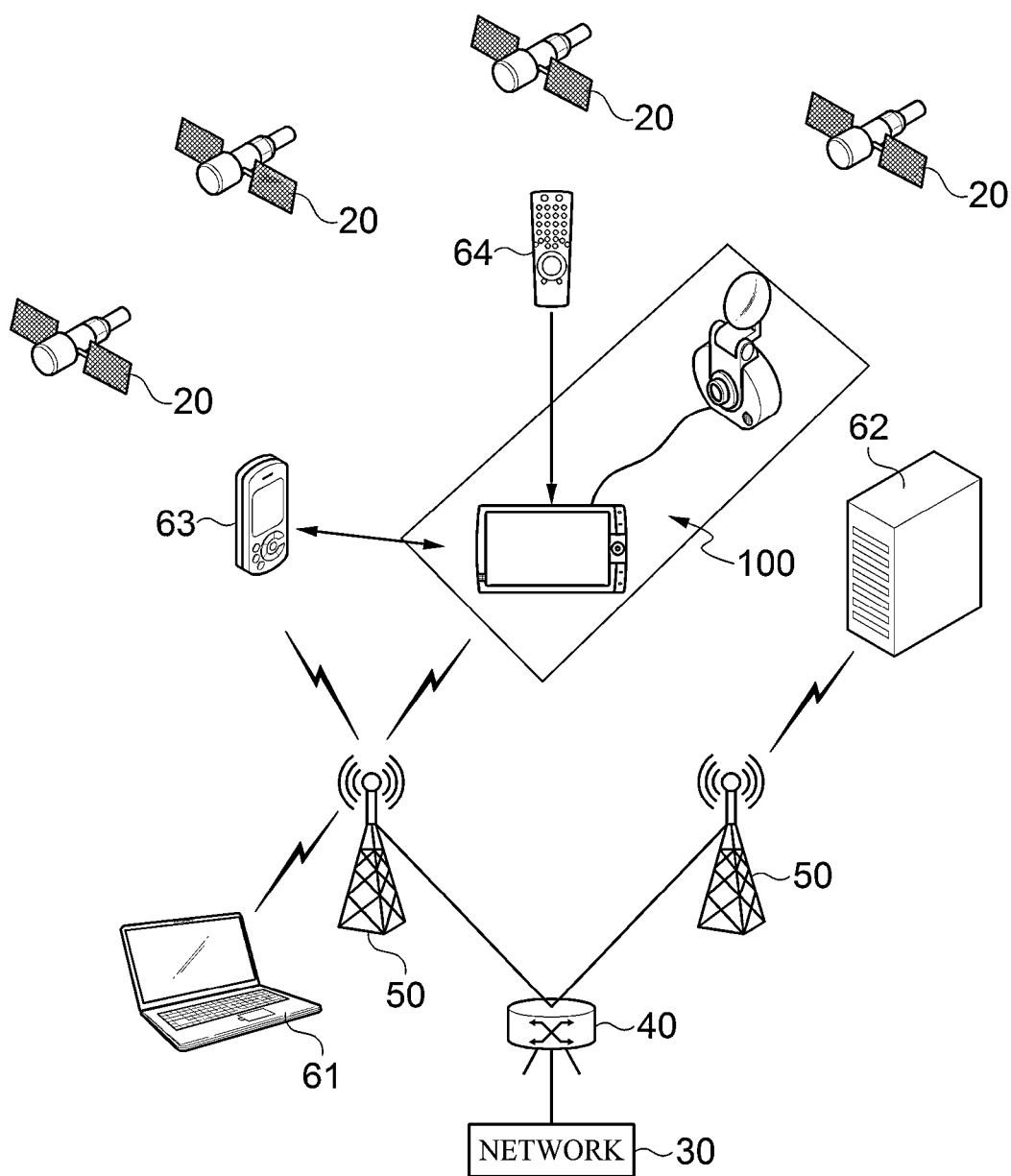
FIG. 10 is a diagram illustrating a system network connected to a system according to an exemplary embodiment of the present invention.

FIG. 10 is a diagram illustrating a system network connected to a system according to an exemplary embodiment of the present invention. Referring to FIG. 10, the system 100 according to an exemplary embodiment of the present disclosure may be implemented by various devices provided in a vehicle such as a navigation device, a vehicle imaging device, a smartphone, or a device providing an AR interface for a vehicle and may be connected to various communication networks and other electronic devices 61 to 64.

In addition, the system 100 may calculate a current location and a current time zone by interworking with a GPS module according to a radio wave signal received from a satellite 20.

Each satellite 20 may transmit L-band frequencies having different frequency bands. The system 100 may calculate a current location based on a time taken for the L band frequency transmitted from each satellite 20 to reach the system 100.

Meanwhile, the system 100 may be wirelessly connected to a network 30 through a controller station (ACR) 40, a base station (RAS) 50, an access point (AP), or the like via the communication unit 180. When the system 100 is connected to the network 30, the system 100 may also be indirectly connected to other electronic devices 61 and 62 connected to the network 30 to exchange data.

Meanwhile, the system 100 may be indirectly connected to the network 30 through another device 63 having a communication function. For example, when the system 100 is not provided with a module that may be connected to the network 30, the system 100 may communicate with another device 63 having a communication function through a short-range communication module or the like.

Figure 11A:
FIGS. 11A and 11B are diagrams illustrating a forward vehicle collision warning guide screen of a system according to an exemplary embodiment of the present invention.
Figure 11B:
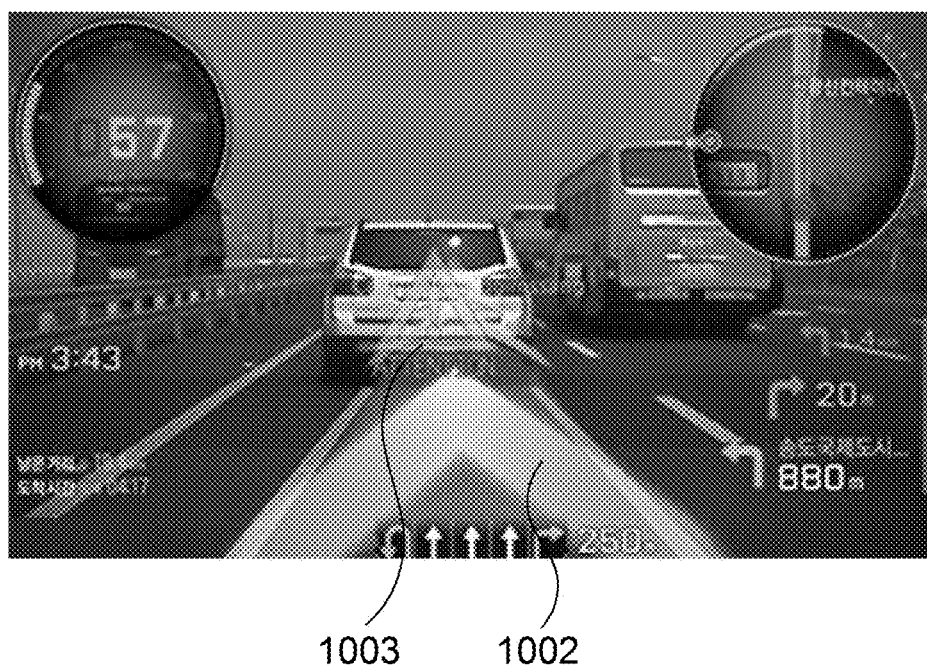

FIGS. 11A and 11B are views illustrating a forward vehicle collision warning screen of a system according to an exemplary embodiment of the present invention. Referring to FIGS. 11A and 11B, the system 100 may generate a guide object indicating a risk of forward vehicle collision and output the generated guide object 1001 or 1003 through AR.

Here, the guide objects 1001 and 1003 may be objects that guide a state in which user attention is required. That is, the forward vehicle collision warning guide may be an attention guide for informing that the vehicle may collide with a forward vehicle. In addition, referring to FIG. 11B, in present exemplary embodiment, a route guide object 1002 may be implemented as a texture image and displayed through AR. Accordingly, the driver may easily recognize the road on which the host vehicle is driving.

In addition, the system 100 may output the guide objects 1001 and 1003 through voice. Alternatively, the system 100 may output the guide objects 1001 and 1003 through a haptic element.

Figure 12:
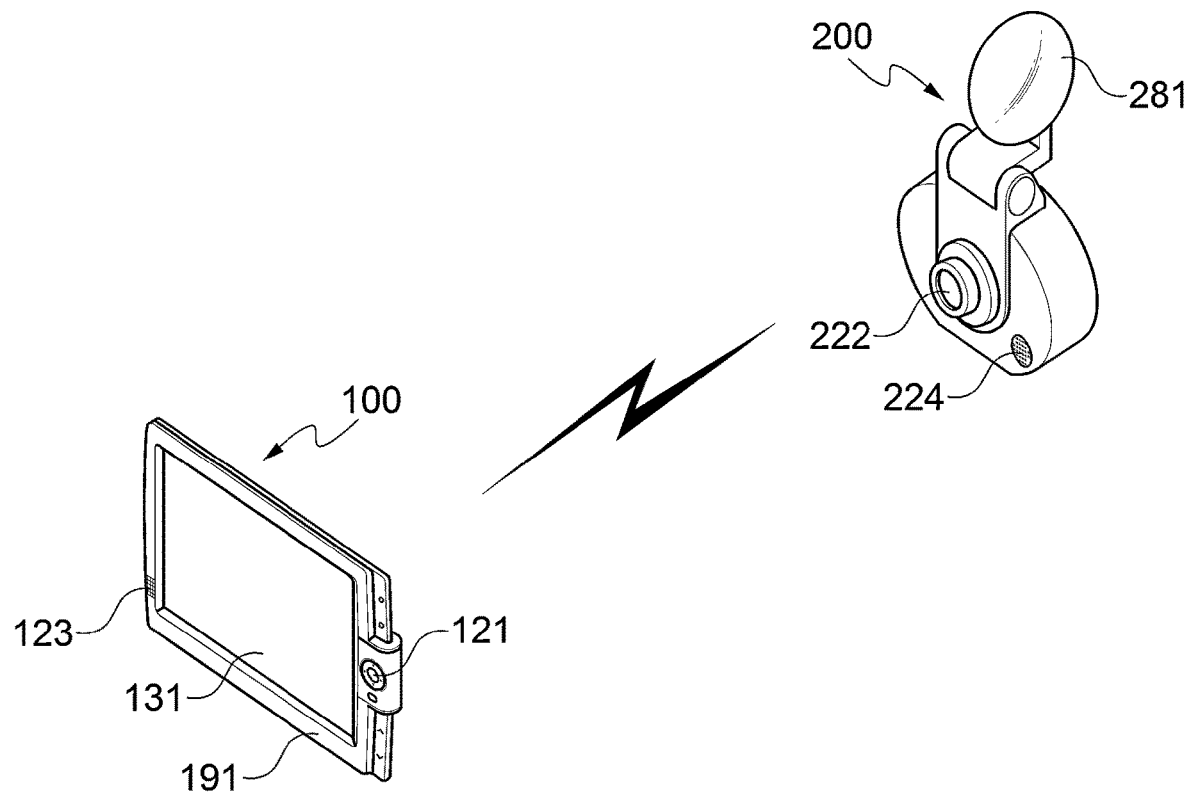
FIG. 12 is a diagram illustrating an implementation form when a system does not have an imaging unit according to an exemplary embodiment of the present invention.

FIG. 12 is a diagram illustrating an implementation form when a system according to an exemplary embodiment of the present invention does not have an image capture unit. Referring to FIG. 12, a vehicle imaging device 200 provided separately from the system 100 for a vehicle may configure a system according to an exemplary embodiment of the present invention using a wired/wireless communication method.

The system 100 for a vehicle may include a display unit 131 provided on the front of the housing, a user input unit 121, and a microphone unit 123.

The vehicle imaging device 200 may include a camera 222, a microphone 224, and an attachment part 281.

Figure 13:
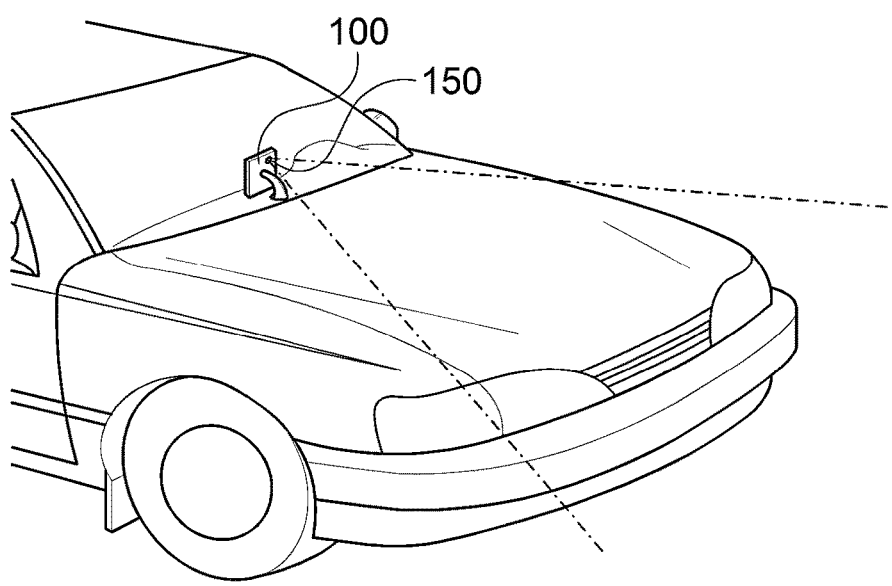
FIG. 13 is a diagram illustrating an implementation form when a system includes an imaging unit according to an exemplary embodiment of the present invention.

FIG. 13 is a diagram illustrating an implementation form when a system according to an exemplary embodiment of the present invention having an image capture unit. Referring to FIG. 13, when the system. 100 includes an image capture unit 150, the image capture unit 150 may capture an image of the front of the vehicle and a display part of the system 100 may be recognized by the user. Accordingly, the system according to an exemplary embodiment of the present invention may be implemented.

Figure 14:
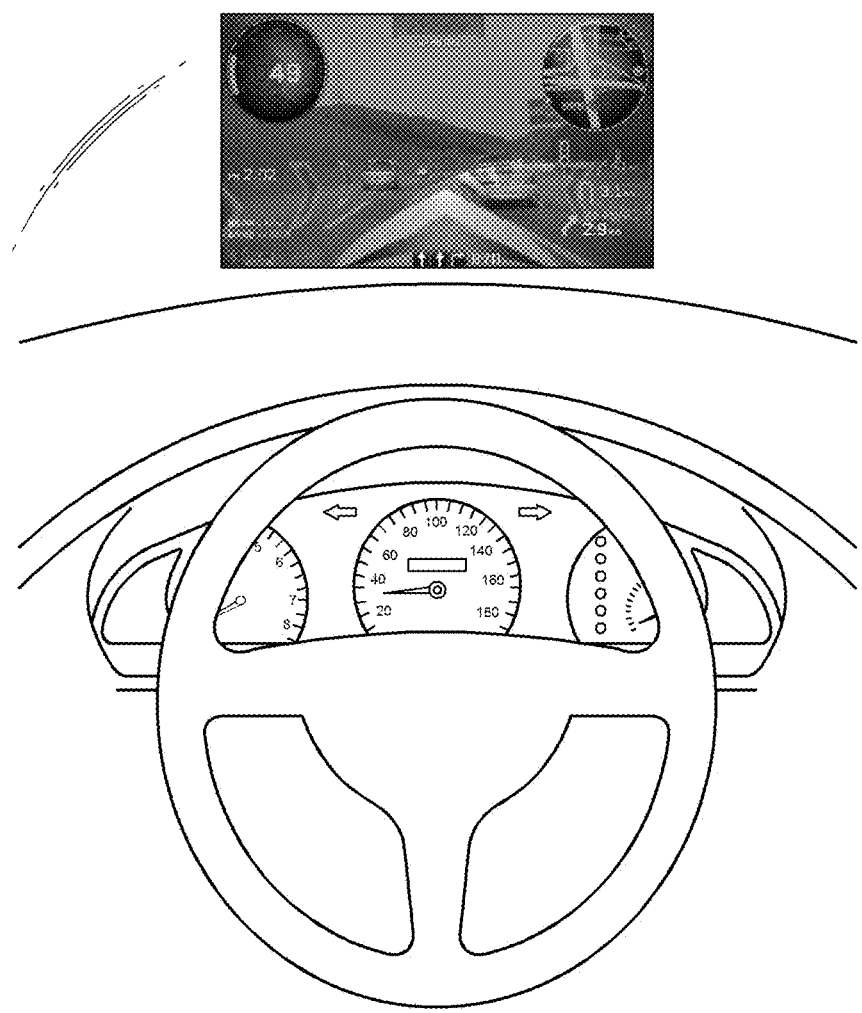
FIG. 14 is a diagram illustrating an implementation form using a head-up display (HUD) according to an exemplary embodiment of the present invention.

FIG. 14 is a diagram illustrating an implementation form using a head-up display (HUD) according to an exemplary embodiment of the present invention. Referring to FIG. 14, the HUD may display an AR guide screen on the HUD through wired/wireless communication with other devices.

For example, the AR may be provided through image overlay using the HUD using a vehicle windshield or a separate image output device, and the AR providing unit 160 may generate an interface image overlaid on a reality image or glass as described above. Accordingly, AR navigation or vehicle infotainment system may be implemented.

Meanwhile, the forward vehicle collision warning guide method according to various exemplary embodiments of the present disclosure described above may be implemented as a program and provided to a server or devices. Accordingly, each device may access the server or device where the program is stored, to download the program.

Meanwhile, in another exemplary embodiment, a forward vehicle detecting method or a forward vehicle collision warning guide method according to the present invention may be configured by a module in a control device 2100 of an autonomous vehicle 2000. That is, a memory 2122 and a processor 2124 of the control device 2100 may implement the forward vehicle detecting method or the forward vehicle collision warning guide method in software.

This will be described in detail with reference to FIG. 15 hereinafter.

Figure 15:
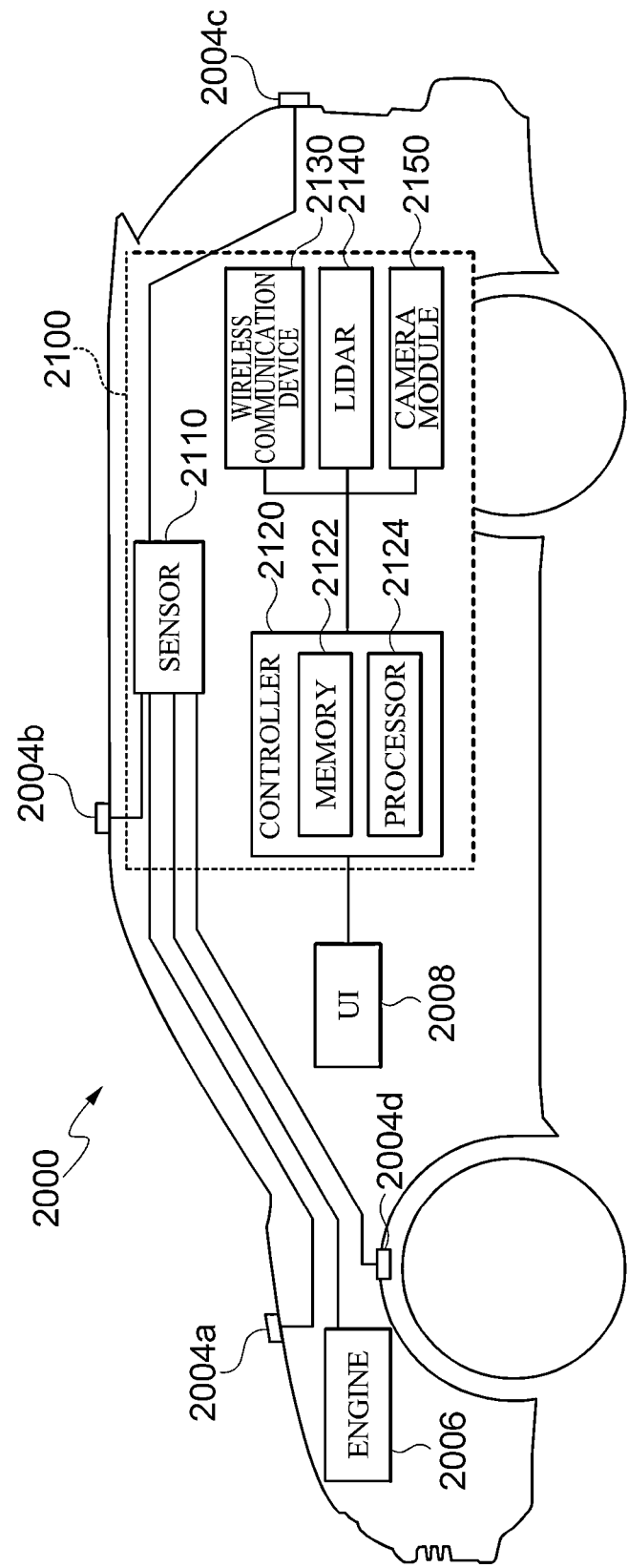
FIG. 15 is a block diagram illustrating a configuration of an autonomous vehicle according to an exemplary embodiment of the present invention.

FIG. 15 is a block diagram illustrating a configuration of the autonomous vehicle 2000 according to an exemplary embodiment of the present invention.

Referring to FIG. 15, the autonomous vehicle 2000 according to the present exemplary embodiment may include a control device 2100, sensing modules 2004a, 2004b, 2004c, and 2004d, an engine 2006, and a user interface 2008.

In the present exemplary embodiment, the control device 2100 may include a controller 2120 including the memory 2122 and the processor 2124, a sensor 2110, a wireless communication device 2130, a LiDAR 2140, and a camera module 2150.

In present exemplary embodiment, the controller 2120 may be configured at the time when the vehicle is manufactured by a manufacturer or may be additionally configured to perform a function of autonomous driving after the vehicle is manufactured. Alternatively, a component for performing a continuous additional function may be included through upgrading of the controller 2120 configured at the time of manufacture.

The controller 2120 may deliver a control signal to the sensor 2110, the engine 2006, the user interface 2008, the wireless communication device 2130, the LiDAR 2140, and the camera module 2150 included as other components in the vehicle. Although not shown, the control signal may also be transmitted to an acceleration device, a braking system, a steering device, or a navigation device related to driving of the vehicle.

In the present exemplary embodiment, the controller 2120 may control the engine 2006. For example, the controller 2120 may detect a speed limit of a road on which the autonomous vehicle 2000 is driving and control the engine 2006 to prevent a driving speed from exceeding the speed limit or control the engine 2006 to accelerate the driving speed of the autonomous vehicle 2000 within a range not exceeding the speed limit. In addition, when the sensing module 2004a, 2004b, 2004c, or 2004d detects and transmits an environment outside the vehicle to the sensor 2110, the controller 2120 may receive the external environment and generate a signal for controlling the engine 2006 or a steering device (not shown) to control the driving of the vehicle.

When other vehicles or obstacles exist in front of the vehicle, the controller 2120 may control the engine 2006 or the braking system to decelerate the driving vehicle and control a trace, a driving route, and a steering angle in addition to the speed. Alternatively, the controller 2120 may control the driving of the vehicle by generating a necessary control signal according to recognition information of a driving lane, a driving signal, or other external environment of the vehicle.

In addition to generation of the control signal by the controller 2120 itself, the controller 2120 may control the driving of the vehicle by performing communication with a nearby vehicle or a central server and transmitting a command for controlling peripheral devices through received information.

In addition, if a position or an angle of view of the camera module 2150 is changed, it may be difficult to accurately recognize a vehicle or lane according to the present exemplary embodiment. Thus, in order to prevent this, the controller may generate a control signal to control the camera module 2150 to perform calibration. Therefore, in the present exemplary embodiment, since the controller 2120 generates the calibration control signal to the camera module 2150, even if a mounting position of the camera module 2150 is changed due to vibration or shock generated due to movement of the autonomous vehicle 2000, a normal mounting position, direction, angle of view, and the like of the camera module 2150 may be continuously maintained. The controller 2120 may generate the control signal for the camera module 2150 to perform calibration if previously stored initial mounting position, direction, angle of view information of the camera module 2150 and an initial mounting position, direction, angle of view information, and the like of the camera module 2150 measured while the autonomous vehicle 2000 is driving are different by a threshold value or greater.

In the present exemplary embodiment, the controller 2120 may include the memory 2122 and the processor 2124. The processor 2124 may execute software stored in the memory 2122 according to a control signal from the controller 2120. Specifically, the controller 2120 may store data and instructions for performing a lane marking method or a lane departure guide method according to the present invention in the memory 2122, and the instructions may be executed by the processor 2124 to implement one or more methods disclosed herein.

In this case, the memory 2122 may be stored in a recording medium executable by the nonvolatile processor 2124. The memory 2122 may store software and data through appropriate internal and external devices. The memory 2122 may include a random access memory (RAM), a read only memory (ROM), a hard disk, and a memory 2122 device connected to a dongle.

The memory 2122 may store at least an operating system (OS), a user application, and executable instructions. The memory 2122 may also store application data and array data structures.

The processor 2124, which is a microprocess or an appropriate electronic processor, may be a controller, microcontroller or state machine.

The processor 2124 may be implemented by combining computing devices, and the computing devices may include a digital signal processor, a microprocessor or an appropriate combination thereof.

In addition, in the present exemplary embodiment, the control device 2100 may monitor the inside and outside features of the autonomous vehicle 2000 and detect a state with at least one sensor 2110.

The sensor 2110 may include at least one sensing module 2004, and the sensing module 2004 may be implemented at a specific position of the autonomous vehicle 2000 according to a sensing purpose. The sensing module 2004 may be located at the lower, rear, front, top, or side ends of the autonomous vehicle 2000 and may also be located at an internal component or a tire of the vehicle.

Through this, the sensing module 2004 may detect information related to driving such as the engine 2006, a tire, a steering angle, a speed, a weight of the vehicle, and the like as the internal information of the vehicle. In addition, the at least one sensing module 2004 may include an acceleration sensor 2110, a gyroscope, an image sensor 2110, a RADAR, an ultrasonic sensor, a LiDAR sensor, and the like and detect movement information of the autonomous vehicle 2000.

The sensing module 2004 may receive specific data regarding external environmental conditions such as state information of a road on which the autonomous vehicle 2000 is located, nearby vehicle information, weather, and the like as external information, and detect a corresponding parameter of the vehicle. The sensed information may be stored in the memory 2122 depending on the purpose, either temporarily or in the long term.

In the present exemplary embodiment, the sensor 2110 may integratedly collect information of the sensing modules 2004 for collecting information generated inside and outside the autonomous vehicle 2000.

The control device 2100 may further include a wireless communication device 2130.

The wireless communication device 2130 is configured to implement wireless communication between the autonomous vehicles 2000. For example, the autonomous vehicle 2000 may communicate with a user's mobile phone or another wireless communication device 2130, another vehicle, a central device (traffic control device), a server, and the like. The wireless communication device 2130 may transmit and receive a wireless signal according to an access wireless protocol. A wireless communication protocol may be Wi-Fi, Bluetooth, long-term evolution (LTE), code division multiple access (CDMA), wideband code division multiple access (WCDMA), global systems for mobile communications (GSM) but is not limited thereto In addition, in the present exemplary embodiment, the autonomous vehicle 2000 may implement inter-vehicle communication through the wireless communication device 2130. That is, the wireless communication device 2130 may communicate with other vehicles on the road through vehicle-to-vehicle communication. The autonomous vehicle 2000 may transmit and receive information such as a driving warning and traffic information through vehicle-to-vehicle communication and may request information or receive a request from another vehicle. For example, the wireless communication device 2130 may perform V2V communication as a dedicated short-range communication (DSRC) device or a cellular-V2V (C-V2V) device. In addition to inter-vehicle communication, vehicle to everything communication (V2X) between a vehicle and an object (e.g., an electronic device carried by a pedestrian) may be implemented through the wireless communication device 2130.

In addition, the control device 2100 may include a LiDAR device 2140. The LiDAR device 2140 may detect an object around the autonomous vehicle 2000 during an operation using data sensed by the LiDAR sensor. The LiDAR device 2140 may transmit the detected information to the controller 2120, and the controller 2120 may operate the autonomous vehicle 2000 according to the detection information. For example, the controller 2120 may instruct the vehicle to reduce a speed through the engine 2006 if there is a forward vehicle driving at a low speed in the detection information. Alternatively, the controller may instruct the vehicle to reduce an entry speed according to a curvature of a curve to which the vehicle moves.

The control device 2100 may further include the camera module 2150. The controller 2120 may extract object information from an external image captured by the camera module 2150 and allow the controller 2120 to process corresponding information.

In addition, the control device 2100 may further include imaging devices for recognizing an external environment. In addition to the LiDAR 2140, a RADAR, a GPS device, a driving distance measuring device (odometry), and other computer vision devices may be used, and these devices may be selectively or simultaneously operated as needed to allow more precise sensing.

The autonomous vehicle 2000 may further include the user interface 2008 for user input for the control device 2100 described above. The user interface 2008 may allow the user to input information through appropriate interactions. For example, the user interface 2008 may be implemented as a touch screen, a keypad, an operation button, or the like. The user interface 2008 may transmit an input or a command to the controller 2120, and the controller 2120 may perform a control operation of the vehicle in response to the input or the command.

In addition, the user interface 2008 may allow a device outside the autonomous vehicle 2000 to communicate with the autonomous vehicle 2000 through the wireless communication device 2130. For example, the user interface 2008 may interwork with a mobile phone, tablet, or other computer devices.

Further, in the present exemplary embodiment, the autonomous vehicle 2000 has been described as including an engine 2006, but it may also include other types of propulsion systems. For example, the vehicle may be driven by electrical energy and may be driven through hydrogen energy or a hybrid system as a combination thereof. Accordingly, the controller 2120 may include a propulsion mechanism according to the propulsion system of the autonomous vehicle 2000 and provide corresponding control signals to components of each propulsion mechanism.

Figure 16:
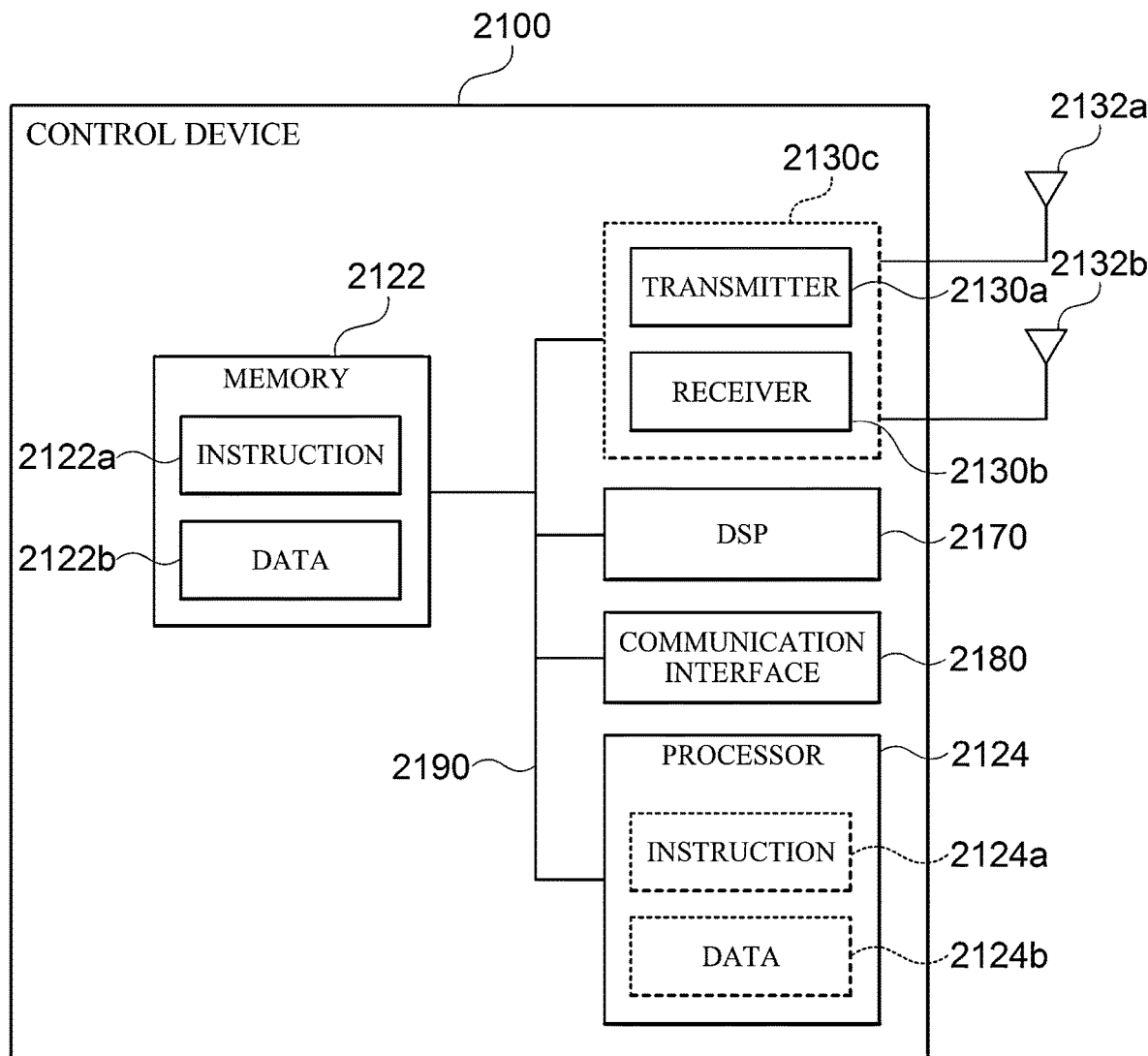
FIG. 16 is a block diagram illustrating a detailed configuration of a control device according to an exemplary embodiment of the present invention.

Hereinafter, the detailed configuration of the control device 2100 for performing the forward vehicle detecting method or the forward vehicle collision warning guide method according to the present invention with reference to FIG. 16 will be described in more detail.

The control device 2100 includes the processor 2124. The processor 2124 may be a general-purpose single or multi-chip microprocessor, dedicated microprocessor, microcontroller, programmable gate array, or the like. The processor may be referred to as a central processing unit (CPU). In addition, in the present exemplary embodiment, the processor 2124 may be used as a combination of a plurality of processors.

The control device 2100 also includes the memory 2122. The memory 2122 may be a certain electronic component capable of storing electronic information. The memory 2122 may also include a combination of memories 2122 in addition to a single memory.

Data and instructions 2122a for performing the forward vehicle detecting method or the forward vehicle collision warning guide method according to the present invention may be stored in the memory 2122. When the processor 2124 executes the instructions 2122a, all or part of the instructions 2122a and the data 2122b required for the execution of the instructions may be loaded 2124a and 2124b onto the processor 2124.

The control device 2100 may include a transmitter 2130a, a receiver 2130b, or a transceiver 2130c for allowing the transmission and reception of signals. One or more antennas 2132a and 2132b may be electrically connected to the transmitter 2130a, the receiver 2130b, or each transceiver 2130c and may include further antennas.

The control device 2100 may include a digital signal processor (DSP) 2170. The DSP 2170 allows the vehicle to process digital signals quickly.

The control device 2100 may include a communication interface 2180. The communication interface 2180 may include one or more ports and/or communication modules for connecting other devices to the control device 2100. The communication interface 2180 may allow the user and the control device 2100 to interact with each other.

Various components of the control device 2100 may be connected together by one or more buses 2190, and the buses 2190 may include a power bus, a control signal bus, a status signal bus, a data bus, and the like. The components may transmit information to each other via the bus 2190 and perform a desired function under the control of the processor 2124.

The device described herein may be implemented using hardware components, software components, or a combination thereof. For example, the hardware components may include microphones, amplifiers, band-pass filters, audio to digital converters, and processing devices. A processing device may be implemented using one or more general-purpose or special purpose computers, such as, for example processor, a controller and an arithmetic logic unit (ALU), a digital signal processor, a microcomputer, a field programmable array (FPGA), a programmable logic unit (PLU), a microprocessor or any other device capable of responding to and executing instructions in a defined manner.

The processing device may run an operating system (OS) and one or more software applications that run on the OS. The processing device also may access, store, manipulate, process, and create data in response to execution of the software. For the convenience of understanding, the processing device is described as a single processing device; however, one skilled in the art will appreciate that the processing device may include multiple processing elements and multiple types of processing elements. For example, a processing device may include multiple processors or a processor and a controller. In addition, other processing configurations such as parallel processors are also possible.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described exemplary embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the exemplary embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical discs; and hardware devices that are specially configured to store and perform program instructions, such as read-only memory (ROM), random access memory (RAM), flash memory, and the like. Examples of program instructions include both machine codes, such as those produced by a compiler, and files containing higher level codes that may be executed by the computer using an interpreter. The described hardware devices may be configured to act as one or more software modules in order to perform the operations of the above-described exemplary embodiments, or vice versa.

The above description is simply given for illustratively describing the technical spirit of the present invention, and those skilled in the art will appreciate that various modifications, changes and substitutions are possible, without departing from the essential characteristic of the present invention.

Accordingly, the exemplary embodiment disclosed in the present invention and the accompanying drawings are not intended to limit but describe the technical spirit of the present invention, and the scope of the technical spirit of the present invention is not limited by the exemplary embodiment and the accompanying drawings. The scope of the present invention shall be interpreted by the appended claims and it shall be interpreted that all of the technical spirits in the equivalent range are included in the scope of the present invention.

What is claimed is:

1. A vehicle collision warning system comprising:
an image input unit receiving continuously captured front images;
an area setting unit setting a search area of a vehicle in a target image based on a location of the vehicle or vehicle area detected from a previous image among the front images;
a vehicle detecting unit detecting the vehicle from the search area according to a machine learning model;
a vehicle tracking unit tracking the vehicle in the target image using feature points of the vehicle extracted from the previous image according to a vehicle detection result based on the machine learning model; and
a controller generating a vehicle collision warning guide based on the detected or tracked vehicle, outputting the generated vehicle collision warning guide through an output unit.

2. The system of claim 1,
wherein the controller calculates a relative speed of the vehicle in consideration of a change of a distance to the vehicle in the front images and a frame rate and generates front collision warning guide information by comparing the relative speed of the vehicle with a speed of a host vehicle.

3. The system of claim 1,
wherein the controller calculates required acceleration required for deceleration using an acceleration of the vehicle, a relative speed between the vehicle and a host vehicle, and the distance between the vehicle and the host vehicle.

4. The system of claim 3,
wherein the controller calculates the required acceleration by further considering a driving distance for a time required for a driver of the host vehicle to react to control a brake for deceleration.

5. The system of claim 3,
wherein the controller determines whether to calculate the required acceleration by comparing a vehicle width of the host vehicle with a lateral distance between the center lines of both vehicles when detecting a cut-in vehicle that changes lane.

6. The system of claim 3,
wherein the controller controls the output unit by stages according to the required acceleration.

7. The system of claim 3,
if the required acceleration is a first level, the controller controls the output unit to output a first deceleration guide, and
if the required acceleration is a second level, the controller controls the output unit to output a second deceleration guide.

8. The system of claim 7,
wherein the first level is a numerical value indicating that driver needs to decelerate preliminarily, and
wherein the numerical value indicating the need for deceleration is calculated in consideration of the distance between the host vehicle and the vehicle, the speed of the vehicle, and the number of lane.

9. The system of claim 7,
wherein the second level is a numerical value indicating that the driver needs a higher degree of deceleration.

10. The system of claim 9,
if the required acceleration is lower than the first level or if the speed of the host vehicle is lower than a reference speed, the controller controls the output unit not to output a deceleration guide.

11. The system of claim 10,
wherein the controller determines a condition having priority over the vehicle collision warning and controls the output unit not to output the deceleration guide even if the acceleration exceeds the determined level.

12. The system of claim 1,
wherein the output unit includes AR (Augmented Reality) providing unit,
wherein the AR providing unit output the guidance through augmented reality.

13. Autonomous vehicle comprising:
a control device detecting a forward vehicle or providing forward collision warning guidance for autonomous driving of the autonomous vehicle,
wherein the controller comprises:
an image input unit receiving continuously captured front images;
an area setting unit setting a search area of a vehicle in a target image based on a location of the vehicle or vehicle area detected from a previous image among the front images;
a vehicle detecting unit detecting the vehicle from the search area according to a machine learning model; and
a vehicle tracking unit tracking the vehicle in the target image using feature points of the vehicle extracted from the previous image according to a vehicle detection result based on the machine learning model.

14. The Autonomous vehicle of claim 13,
when other vehicles in front of a host vehicle, the control device control an engine or a braking system to decelerate the host vehicle.

15. The Autonomous vehicle of claim 13,
when other vehicles in front of a host vehicle, the control device control at least one of a trace of the host vehicle, a driving route of the host vehicle, and a steering angle of the host vehicle.

16. The Autonomous vehicle of claim 15, wherein the search area is enlarged and set based on the vehicle area detected from the previous image.

17. The Autonomous vehicle of claim 13, wherein the search area is enlarged and set according to a size of the detected vehicle.

18. The Autonomous vehicle of claim 13, wherein the vehicle tracking unit tracks the vehicle by extracting feature points of the vehicle from the vehicle area detected from the previous image.

19. The Autonomous vehicle of claim 13, wherein the vehicle tracking unit tracks the location of the vehicle from the target image using the extracted feature points of the vehicle when the vehicle detection based on the machine learning model fails or a reliability of the detected vehicle is below a reference.

20. The Autonomous vehicle of claim 13, wherein the vehicle tracking unit tracks the vehicle in parallel with the vehicle detection in the detecting process and terminates the tracking of the vehicle when the vehicle detection based on the machine learning model is successful or when a reliability of the detected vehicle is above a reference.

* * * * *

UNITED STATES PATENT AND TRADEMARK OFFICE
CERTIFICATE OF CORRECTION

| | | |
|---|---|---|
| PATENT NO. | : 11,881,030 B2 | Page 1 of 1 |
| APPLICATION NO. | : 17/939175 | |
| DATED | : January 23, 2024 | |
| INVENTOR(S) | : Shin Hyoung Kim | |

It is certified that error appears in the above-identified patent and that said Letters Patent is hereby corrected as shown below:

In the Claims

<u>At Column 27, Line 29:</u>
Change:
"controller"
To be:
--"control device"--

Signed and Sealed this
Tenth Day of June, 2025

Coke Morgan Stewart
*Acting Director of the United States Patent and Trademark Office*